(12) United States Patent
Sawa

(10) Patent No.: US 10,771,279 B2
(45) Date of Patent: Sep. 8, 2020

(54) COMMUNICATION TERMINAL DEVICE, INFORMATION COMMUNICATION SYSTEM, RECORDING MEDIUM, AND INFORMATION COMMUNICATION METHOD

(71) Applicant: MegaChips Corporation, Osaka-shi (JP)

(72) Inventor: Yuta Sawa, Osaka (JP)

(73) Assignee: MEGACHIPS CORPORATION, Osaka-Shi (JP)

( * ) Notice: Subject to any disclaimer, the term of this patent is extended or adjusted under 35 U.S.C. 154(b) by 114 days.

(21) Appl. No.: 15/961,915

(22) Filed: Apr. 25, 2018

(65) Prior Publication Data

US 2018/0323998 A1   Nov. 8, 2018

(30) Foreign Application Priority Data

May 2, 2017   (JP) .................................. 2017-091511

(51) Int. Cl.
*H04L 12/40* (2006.01)
*H04W 84/20* (2009.01)
(Continued)

(52) U.S. Cl.
CPC ...... *H04L 12/40013* (2013.01); *H04L 12/403* (2013.01); *H04L 12/40202* (2013.01);
(Continued)

(58) Field of Classification Search
None
See application file for complete search history.

(56) References Cited

U.S. PATENT DOCUMENTS

| 5,691,980 A | 11/1997 | Welles, II et al. |
| 6,901,275 B1 | 5/2005 | Aoyagi |

(Continued)

FOREIGN PATENT DOCUMENTS

| JP | 2010-277467 A | 12/2010 |
| JP | 2011-130307 A | 6/2011 |

(Continued)

OTHER PUBLICATIONS

Partial Search Report issued in European Application 18169853.1 dated Jul. 17, 2018.

(Continued)

*Primary Examiner* — Robert M Morlan
(74) *Attorney, Agent, or Firm* — Xsensus LLP

(57) ABSTRACT

A communication terminal device connected to a network and performing data communications between another communication terminal device through the network, includes a storage configured to store proper information used as a criterion for switching an operation mode between a master unit operation mode and a slave unit operation mode, and circuitry configured to switch the master unit operation mode of a self device to the slave unit operation mode based on the proper information, while the self device is operating by the master unit operation mode. The master unit operation mode is the operation mode of the communication terminal device operating as a master unit, and the slave unit operation mode is the operation mode of the communication terminal device operating as a slave unit.

20 Claims, 9 Drawing Sheets

(51) Int. Cl.
  *H04L 12/24* (2006.01)
  *H04L 12/403* (2006.01)
  *H04W 8/00* (2009.01)

(52) U.S. Cl.
  CPC ......... *H04L 41/0668* (2013.01); *H04W 84/20* (2013.01); *H04W 8/005* (2013.01)

(56) References Cited

U.S. PATENT DOCUMENTS

| | | | | |
|---|---|---|---|---|
| 7,587,465 | B1* | 9/2009 | Muchow | G06F 9/5061 709/208 |
| 8,644,757 | B2* | 2/2014 | Curcio | G06F 1/1626 455/3.06 |
| 9,883,472 | B1* | 1/2018 | Tamhane | H04W 56/001 |
| 2003/0124979 | A1 | 7/2003 | Tanada et al. | |
| 2005/0086273 | A1 | 4/2005 | Loebbert et al. | |
| 2005/0262216 | A1* | 11/2005 | Kashiwabara | H04L 12/2803 709/208 |
| 2009/0240781 | A1 | 9/2009 | Otsuka | |
| 2010/0074155 | A1 | 3/2010 | Park et al. | |
| 2014/0198778 | A1 | 7/2014 | Fraser | |
| 2014/0232683 | A1 | 8/2014 | Sakai | |

FOREIGN PATENT DOCUMENTS

| | | |
|---|---|---|
| JP | 2011-135608 | 7/2011 |
| JP | 2011-199704 | 10/2011 |

OTHER PUBLICATIONS

Extended Search Report issued in European Application 18169853.1 dated Sep. 5, 2018.

QUALCOMM, "Time Variations of Gap Patterns with Bluetooth Streaming", 3GFP TSG-RAN WG2 Meeting #72, R2-106342, 6 Pages total, (Nov. 11-15, 2010).

European Communication pursuant to Article 94(3), dated Jan. 22, 2020, issued in corresponding European Patent Application No. 18 169 853.1.

* cited by examiner

COMMUNICATION TERMINAL DEVICE, INFORMATION COMMUNICATION SYSTEM, RECORDING MEDIUM, AND INFORMATION COMMUNICATION METHOD

CROSS REFERENCE TO RELATED APPLICATIONS

The present application claims priority from Japanese Application Number 2017-091511 filed in Japan on May 2, 2017, the contents of which are incorporated herein by reference.

BACKGROUND

Technical Field

The present disclosure relates to techniques for determining a master unit and a slave unit, in the information communication system including a plurality of communication terminal devices.

Description of the Background Art

Conventionally, a technique which determines a master unit and a slave unit in the information communication system including a plurality of communication terminal devices, is known. For example, the techniques are disclosed in the Patent Document 1 (Japanese Unexamined Patent Application Publication No. 2011-135608) and the Patent Document 2 (Japanese Unexamined Patent Application Publication No. 2011-199704).

According to the technology indicated in the Patent Document 1, in the wireless LAN device which can be used not only as a wireless master unit but also as a wireless slave unit by changing a setup of operation mode, the technology which automates the setup of the operation mode of the wireless LAN device is shown. According to the technology indicated in the Patent Document 1, whether the wireless LAN device is used as a wireless master unit is automatically judged according to the kind (in other words, "responding to hardware structure") of devices connected to the wireless LAN device.

Generally speaking, if a plurality of master units coexists on a network, the problem that the group of devices which should form one network is divided to some groups by each master unit will be produced.

However, in the technology indicated in the Patent Document 1, when a plurality of devices equipped with the function of a wireless master unit has been arranged on the network, there is a problem that a plurality of wireless master units will be in a coexistence state. That is, in the technology of the Patent Document 1, two or more devices equipped with the function of a wireless master unit cannot be arranged on the network. Therefore, there is a problem that spare device cannot be arranged, to support the state of emergency of the wireless master unit, for example.

In the Patent Document 2, the technology which arranges a plurality of printers (devices equipped with the function of a wireless master unit) on a network is indicated. According to the technology indicated in the Patent Document 2, the technology called "first come, first served" is adopted to determine automatically which printer should be as a master apparatus (a wireless master unit). That is, in the Patent Document 2, the printer whose power supply has been switched on faster than other printers and which has been activated fastest, is set up as a wireless master unit. Thereby, only one wireless master unit can be determined.

In the technology indicated in the Patent Document 2, after detecting the absence of a wireless master unit, switching to the operation mode as a wireless master unit is carried out. After switching of operation mode is completed, the communication as a wireless master unit is started (be recognized by other printers as a wireless master unit). However, when the time lag occurred, before communication as a wireless master unit has been started, there is a problem that two or more printers are changed to the wireless master unit and coexist. That is, even if the technology called "first come, first served" is adopted, there is a problem that coexistence of a wireless master unit cannot be completely prevented.

Moreover, once a master unit coexistence situation occurred, the technology indicated in the Patent Document 1 and the Patent Document 2 has the problem that management is not carried out at all.

SUMMARY

The present invention is directed to a communication terminal device connected to a network and performing data communications between another communication terminal device through the network.

According to an aspect of the present invention, the communication terminal device includes a storage configured to store proper information used as a criterion for switching an operation mode between a master unit operation mode and a slave unit operation mode, and circuitry configured to switch the master unit operation mode of a self device to the slave unit operation mode based on the proper information, while the self device is operating by the master unit operation mode. And the master unit operation mode is the operation mode of the communication terminal device operating as a master unit, and the slave unit operation mode is the operation mode of the communication terminal device operating as a slave unit.

According to another aspect of the present invention, the communication terminal device includes circuitry configured to: monitor whether or not the new master unit other than the previous master unit registering a self device exists in the other communication terminal device, while the self device is operating by a slave unit operation mode, acquire the first judging criterion information used as the criterion for judging a priority as the master unit of the previous master unit and the second judging criterion information used as the criterion for judging a priority as the master unit of the new master unit, and decide, when the circuitry judges that the new master unit exists, one of the previous master unit or the new master unit as the master unit of self device based on the first judging criterion information and the second judging criterion information. And the slave unit operation mode is the operation mode of the communication terminal device operating as a slave unit.

The present invention is also directed to an information communication system comprising a plurality of communication terminal devices connected to a network.

According to aspect of the present invention, the communication terminal device includes a storage configured to store proper information used as a criterion for switching an operation mode between a master unit operation mode and a slave unit operation mode, and circuitry configured to switch the master unit operation mode of a self device to the slave unit operation mode based on the proper information, while the self device is operating by the master unit operation mode. And the master unit operation mode is the operation mode of the communication terminal device operating as a master unit, and the slave unit operation mode is the operation mode of the communication terminal device operating as a slave unit.

The present invention is also directed to a non-volatile computer-readable storage medium storing computer-readable instructions.

According to aspect of the present invention, the non-volatile computer-readable storage medium storing computer-readable instructions that, when executed by a computer including storage and circuitry, cause the computer to perform a method includes: storing, by the storage, proper information used as a criterion for switching an operation mode between a master unit operation mode and a slave unit operation mode; and switching, by the circuitry, the master unit operation mode of a self device to the slave unit operation mode based on the proper information, while the self device is operating by the master unit operation mode. And the master unit operation mode is the operation mode of the computer operating as a master unit, the slave unit operation mode is the operation mode of the computer operating as a slave unit, and the computer is connected to a network and performs data communications between another communication terminal device through the network.

According to another aspect of the present invention, the non-volatile computer-readable storage medium storing computer-readable instructions that, when executed by a computer including circuitry, cause the computer to perform a method includes: monitor, by the circuitry, whether or not the new master unit other than the previous master unit registering a self device exists in the other communication terminal device, while the self device is operating by a slave unit operation mode; acquire, by the circuitry, the first judging criterion information used as the criterion for judging a priority as the master unit of the previous master unit and the second judging criterion information used as the criterion for judging a priority as the master unit of the new master unit; and decide, by the circuitry, when the circuitry judges that the new master unit exists, one of the previous master unit or the new master unit as the master unit of self device based on the first judging criterion information and the second judging criterion information. And the slave unit operation mode is the operation mode of the computer operating as a slave unit, and the computer is connected to a network and performs data communications between another communication terminal device through the network.

The present invention is also directed to an information communication method by a plurality of communication terminal devices including circuitry, and having a master unit operation mode operating as a master unit and a slave unit operation mode operating as a slave unit, includes: storing, by the circuitry, proper information used as a criterion for switching an operation mode between the master unit operation mode and the slave unit operation mode in each of the plurality of communication terminal devices; and switching, by the circuitry, when the communication terminal device is operating by the master unit operation mode, the master unit operation mode of a self device to the slave unit operation mode based on the proper information.

These and other objects, features, aspects and advantages of the present invention will become more apparent from the following detailed description of the present invention when taken in conjunction with the accompanying drawings.

DETAILED DESCRIPTION OF DISCLOSED EMBODIMENTS

Figure 1:
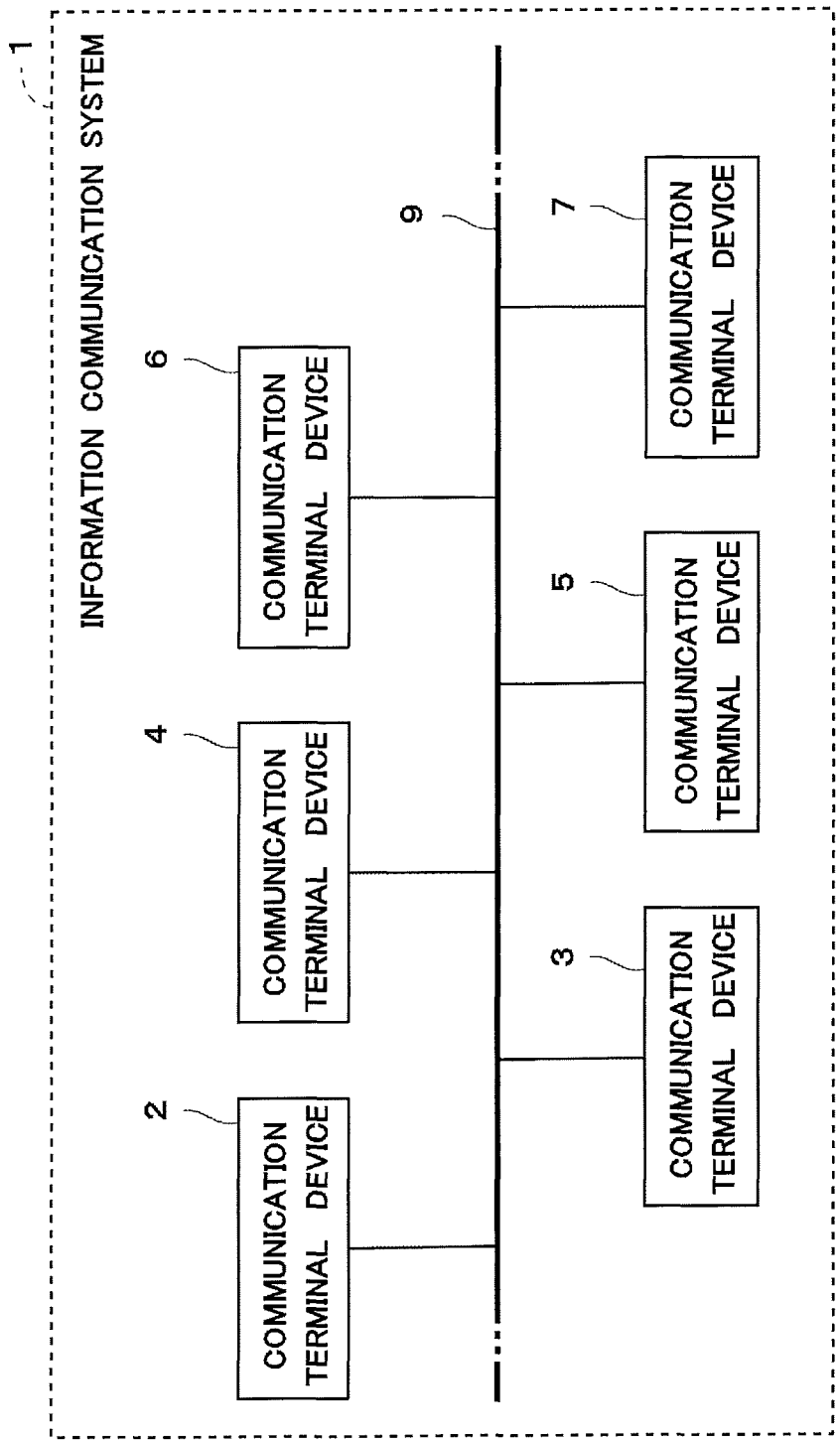
FIG. 1 is a block diagram of an information communication system in accordance with some embodiments.

One or more embodiments are described in detail below with reference to the accompanying drawings. In the following description, the descriptions related to directions and orientations correspond to those in the drawings for convenience of the description unless otherwise described, but are not intended to limit products for which the present invention is put into practice, manufactured products, or the scope of patent rights, for example.

FIG. 1 is a block diagram of an information communication system 1 in accordance with some embodiments. The information communication system 1 includes a plurality of communication terminal devices 2, 3, 4, 5, 6, and 7 connected to the network 9.

In some embodiments, the network 9 is a PLC (Power Line Communication) network. Therefore, the network 9 is a wire communications network which used the commercial power line cable. However, the network 9 is not limited to such a form. That is, the network 9 may be wire communications networks other than PLC, and may be wireless communications networks. Moreover, the network 9 may be built as a communications network in which a wire communications network and a wireless communications network are intermingled.

Moreover, in FIG. 1, six sets of the communication terminal devices 2, 3, 4, 5, 6, and 7 are illustrated. However, the number of the communication terminal devices with which the information communication system 1 is equipped is not limited to six sets.

Moreover, the communication terminal devices 2, 3, 4, 5, 6, and 7 in accordance with some embodiments are constituted as device which all has the same function and composition. However, the communication terminal devices 2, 3, 4, 5, 6, and 7 with which the information communication system 1 is equipped do not necessarily need to be equipped with the same function and composition. In the following description, unless it is refused in particular, the communication terminal device 2 is made into an example to explain the composition and the function of the communication terminal devices 2, 3, 4, 5, 6, and 7.

Figure 2:
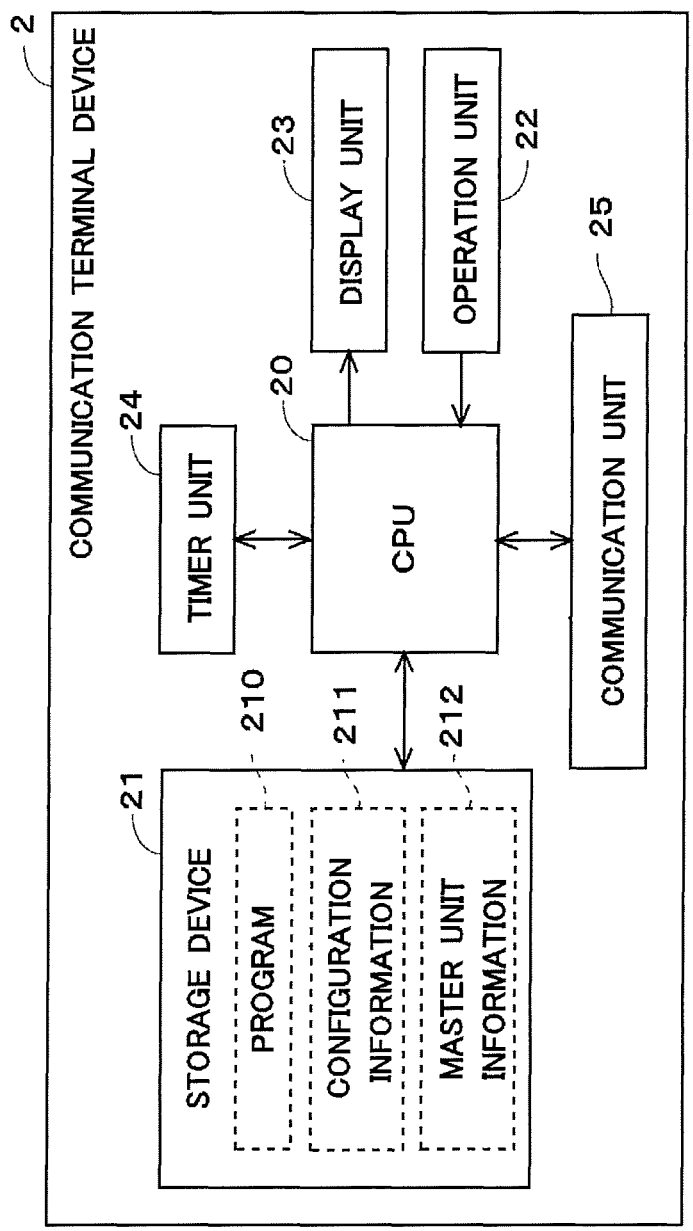
FIG. 2 is a block diagram of a communication tell final device in accordance with some embodiments.

FIG. 2 is a block diagram of the communication terminal device 2 in accordance with some embodiments. The communication terminal device 2 includes a CPU 20 and a storage device 21.

The CPU 20 executes a program 210 stored in the storage device 21 while reading it, and calculates various types of data and generates a control signal, for example. Thus, the CPU 20 has a function of controlling respective components included in the communication terminal device 2 and calculating and generating various types of data. That is, the communication terminal device 2 is configured as a general computer.

The storage device 21 provides a function of storing various types of data in the communication terminal device 2. In other words, the storage device 21 stores electronically fixed information in the communication terminal device 2.

As the storage device 21, a RAM and a buffer used as a temporal working area of the CPU 20, a read-only ROM, a non-volatile memory (e.g., a NAND memory), a hard disk storing a relatively large amount of data, a portable recording medium (e.g., a CD-ROM, a DVD-ROM, a PC card, an SD card, a USB memory) mounted onto a dedicated reader device can be considered, for example. In FIG. 2, the storage device 21 is shown as if it formed a single structure. However, the storage device 21 is usually formed by more than one of the above listed various types of devices (or medium), which are employed as necessary. That is, in some embodiments, the storage device 21 is a general term referring to devices each having a function of storing data.

The actual CPU 20 is an electronic circuit including therein a RAM that allows a high-speed access thereto. Such a storage device included in the CPU 20 is described as being also included in the storage device 21 for convenience of the description. That is, in accordance with some embodiments, it is described that data temporarily stored by the CPU 20 itself is also stored in the storage device 21. As shown in FIG. 2, the storage device 21 is used for storing the program 210, configuration information 211 and master unit information 212.

The configuration information 211 is information which shows various kinds of set situations in the communication terminal device 2. The configuration information 211 is stored in the non-volatile storage media which constitute the storage device 21. Therefore, the contents are not lost even if the configuration information 211 is a case where the power supply of the communication terminal device 2 is turned OFF. In addition, the information included in the configuration information 211 is mentioned later.

The master unit information 212 is the information about a master unit (a self device can also be included) which exists on the network 9. In the technology of the PLC, the communication terminal device 2 which received information can acquire various additional information included in the received information. The additional information can consider addressee, sender, forwarding, transfer source, the information about transmitting time, the number of times of hop, or communication quality, for example. However, additional information is not limited to the information on the contents described here.

Although the details will be described later, based on the acquired additional information, the communication terminal device 2 checks the existence of each communication terminal device 2, 3, 4, 5, 6, and 7 and the various states of them, on the network 9. For example, the communication terminal device 2 detects master units other than self device according to the acquired additional information. And the communication terminal device 2 makes the additional information into the master unit information 212 suitably. That is, the communication terminal device 2 edits additional information, and generates the master unit information 212. Furthermore, based on the addition information, the communication terminal device 2 communicates positively with the detected master unit, collects the required information (It is not additional information.) about the master unit, and also makes the collected information into the master unit information 212.

As shown in FIG. 2, the communication terminal device 2 further includes an operation unit 22, a display unit 23, a timer unit 24, and a communication unit 25.

The operation unit 22 is hardware operable by an operator for giving an instruction to the communication terminal device 2. As the operation unit 22, various keys, buttons, switches, a touch panel, pointing devices, jog dials, and the like are considered.

The display unit 23 is hardware having a function of displaying various kinds of information to the operator to provide the information. As the display unit 23, a lamp, an LED, a liquid crystal display, a liquid crystal panel, and the like are considered.

The timer unit 24 is an electronic circuit which has a function which measures time. The timer unit 24 transmits an interrupt signal to the CPU 20 when the time which has been set by the CPU 20 passes. For example, the timer unit 24 in the communication terminal device 2 is used in order to measure the search lapsed time (describe later) etc. In the following description, when search lapsed time passes, the interrupt signal which is transmitted towards CPU 20 from the timer unit 24 is called a "time out signal".

The communication unit 25 has a function of connecting the communication terminal device 2 to the network 9, in the state in which data communications are possible. As described above, the network 9 in some embodiments is the PLC network. Therefore, the communication unit 25 is an electronic circuit (a PLC module) to accomplish the PLC function.

Figure 3:
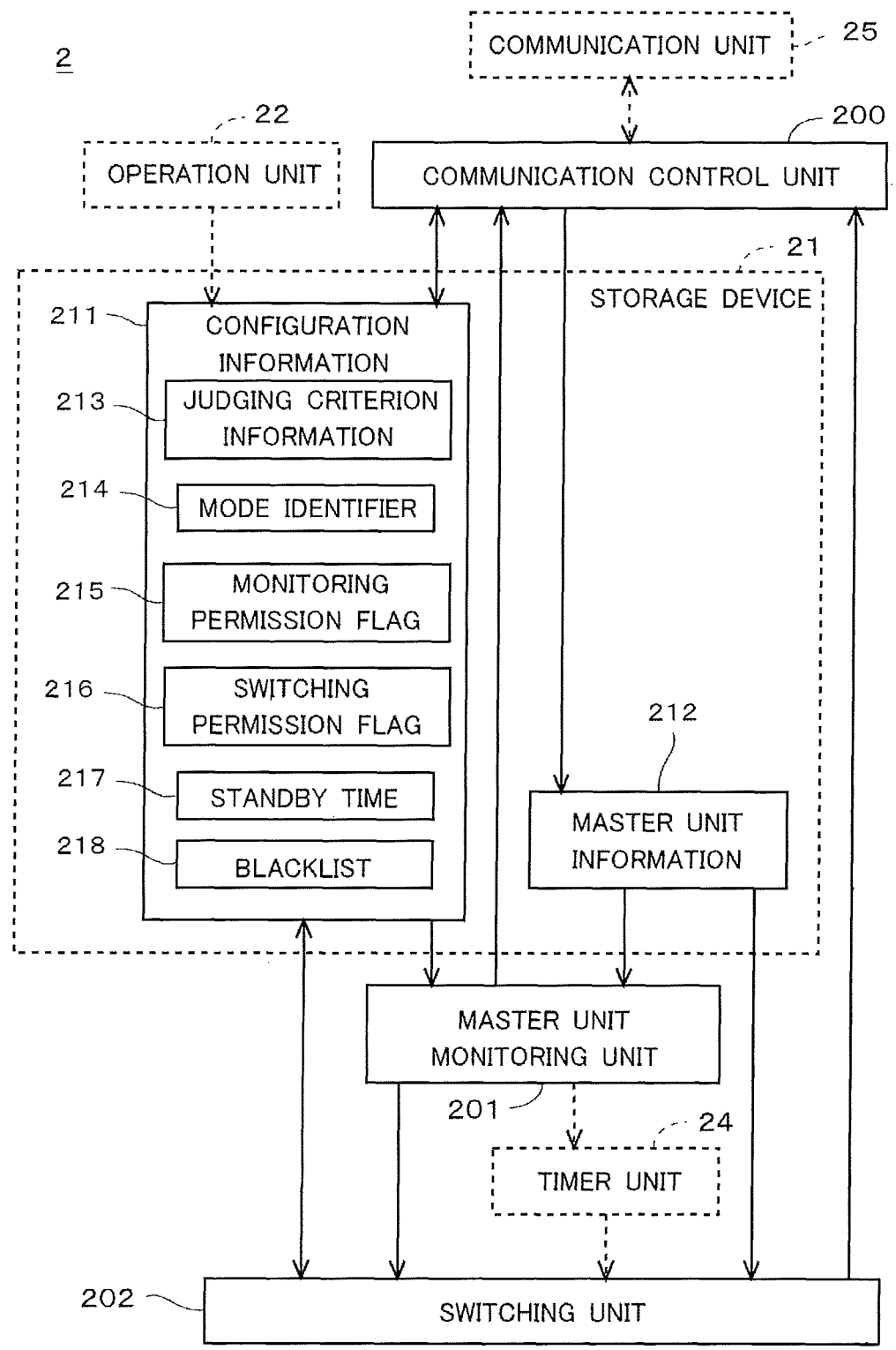
FIG. 3 is a block diagram of functional blocks included in the communication terminal device.

FIG. 3 is a block diagram of functional blocks included in the communication terminal device 2. A communication control unit 200, a master unit monitoring unit 201, and a switching unit 202, that are shown in FIG. 3 are the functional blocks achieved by the operation of the CPU 20 in accordance with the program 210.

As shown in FIG. 3, the configuration information 211 includes a judging criterion information 213, a mode identifier 214, a monitoring permission flag 215, a switching permission flag 216, a standby time 217, and a blacklist 218.

The judging criterion information 213 is information used as the criterion to judge priority as the master unit of the self device in a plurality of the communication terminal devices 2, 3, 4, 5, 6, and 7. Although the details will be described later, in the information communication system 1 in accordance with some embodiments, the priority as the master unit is determined according to the magnitude relation of each MAC address of the communication terminal devices 2, 3, 4, 5, 6, and 7. Therefore, in some embodiments, the judging criterion information 213 which is included in the configuration information 211 is information which indicates the MAC address beforehand assigned to the self device.

The mode identifier 214 is information which indicates whether the self device starts by a slave unit operation mode or by a master unit operation mode, at the time of a reboot. Although the details will be described later, when a operation mode in the communication terminal device 2 has been switched between "the master unit operation mode" and "the slave unit operation mode", the communication terminal device 2 is certainly rebooted promptly. Therefore, while the communication terminal device 2 is working, the present operation mode and the operation mode which is indicated in the mode identifier 214 are almost always in agreement.

That is, in the communication terminal device 2, the present operation mode can be checked by referring to the mode identifier 214 which is contained in the configuration information 211. In the following explanation, when the mode identifier 214 is "1", it means that the communication terminal device 2 starts with the slave unit. On the other hand, when the mode identifier 214 is "0", it means that the communication terminal device 2 is started with the master unit. Moreover, the initial value of the mode identifier 214 is set to "1 (the slave unit operation mode)".

The monitoring permission flag 215 is information which indicates whether the monitoring of whether other communication terminal devices are master units is permitted. In the following explanation, when the monitoring permission flag 215 is "1", it means being invalidity (not permit). On the other hand, when the monitoring permission flag 215 is "0", it means being valid (permit). Moreover, the initial value of the monitoring permission flag 215 is set to "1 (not permit)".

The switching permission flag 216 is information which indicates whether the switching to the master unit operation mode from the slave unit operation mode is permitted. In the following explanation, when the switching permission flag 216 is "1", it means being invalidity (not permit). On the other hand, when the switching permission flag 216 is "0", it means being valid (permit). Moreover, the initial value of the switching permission flag 216 is set to "1 (not permit)".

In addition, when the monitoring permission flag 215 is "0", the information communication system 1 in accordance with some embodiments performs processing regardless of the value of the switching permission flag 216 as what the switching to the slave unit operation mode from the master unit operation mode is permitted. However, it is possible that the propriety of the switching to the slave unit operation mode from the master unit operation mode is judged according to the switching permission flag 216 (or separately independent flag).

When the communication terminal device 2 is performing the slave unit operation mode and the master unit for the self device has not been decided, the communication terminal device 2 starts searching the master unit. In this situation, the standby time 217 is information which indicates time the communication terminal device 2 should be waiting until the master unit is actually found. The standby time 217 is set to the timer unit 24 by CPU 20 (the master unit monitoring unit 201). In order that the timer unit 24 determines the timing which generates the time out signal, the standby time 217 which has been set to the timer unit 24 is used. Although the details will be described later, when search of the master unit has been started, the communication terminal device 2 is waiting until the standby time 217 which has been set in the configuration information 211 has passed. When the standby time 217 has passed without discovering the master unit, the communication terminal unit 2 abandons search of the master unit.

The blacklist 218 is the information which recorded the device which the communication terminal device 2 does not accept as the master unit. When the communication terminal device 2 determines the master unit for the self device, the communication terminal device 2 refers to the blacklist 218. And the communication terminal device 2 refuses to register the device currently recorded on the blacklist 218 as the master unit.

The communication control unit 200 shown in FIG. 3 controls the communication unit 25. That is, the communication control unit 200 realizes the PLC (data communications) between the communication terminal device 2 and the devices which are connected to the network 9.

The communication control unit 200 specifies the information and addressee which are stored in the storage device 21, and makes the communication unit 25 transmit specified information.

Moreover, the communication control unit 200 stores in the storage device 21 the information received by the communication unit 25. For example, when the information (for example, Hello packet) transmitted from master units other than the self device in order to tell the existence has been received by the communication unit 25, the communication control unit 200 creates (or updates) in the storage device 21 the master unit information 212 based on the received information.

The communication control unit 200 refers to the mode identifier 214 of the configuration information 211, and realizes processing (hereinafter, referred to as a "slave unit processing") as the slave unit in the PLC, when the mode identifier 214 is "1". On the other hand, the communication control unit 200 realizes processing (hereinafter, referred to as a "master unit processing") as the master unit in the PLC, when the mode identifier 214 is "0". Since each of the slave unit processing and the master unit processing can apply the known technology for example, detailed explanation is omitted here.

Furthermore, according to the transmitted signal (hereinafter, referred to as a "master unit switching signal") from the switching unit 202, the communication control unit 200 makes the communication unit 25 perform communications (transmission and reception) of packets required in order to change the master unit in which the self device is registered at the time. In addition, when the master unit switching signal is transmitted and the self device is the master unit, the communication control unit 200 makes the communication unit 25 perform communications of packets required in order to switch the self device to the slave unit from the master unit.

The master unit monitoring unit 201 has a function which monitors existence of the master unit which is not the self device. In order for the master unit monitoring unit 201 to monitor existence of the master unit on the network 9, the function of the master unit monitoring unit 201 is accompanied by the operation which searches existence of the master unit on the network 9.

The function to search existence of the master unit (device which can switch as the master unit) at the time of starting of wireless LAN device (communication terminal device) etc., as the technology to approximate to the function which the master unit monitoring unit 201 realizes is proposed in the Japanese Unexamined Patent Application Publication No. 2011-135608 for example. The master unit monitoring unit 201 can adopt such known technology, and can realize the principle which searches existence of the master unit on the network 9.

However, such known technology is the technology which searches for the master unit when a possibility that a communication terminal device is not able to establish communication of the self device is a high situation (or a situation which actually cannot establish). That is, such technology is the processing which is carried out in what is called an "emergency". When communication has already been established and the data communications are stabilizing, the processing of such known technology is not carried out.

On the other hand, the monitoring of the master unit by the master unit monitoring unit 201 is carried out continuously at "normal situation", not only "emergency situation". That is, search of the master unit by the master unit monitoring unit 201 is also performed in "normal situation". "Normal situation" is the time when the communication terminal device 2 is operating normally as the master unit, or the time when the master unit for the communication terminal device 2 is already checked, etc. That is, "normal situation" is the time when the communication terminal device 2 is already performing normal data communications.

When existence of two or more master units has been detected, the master unit monitoring unit 201 transmits the signal (hereinafter, referred to as a "coexistence detection signal") which shows that detection to the switching unit 202. Here, "the case of detecting existence of two or more master units" is the case of detecting existence of master units other than the self device, when the communication terminal device 2 is the master unit operation mode. On the other hand, when the communication terminal device 2 is the slave unit operation mode, "the case of detecting existence of two or more master units" is the case of detecting existence of master units other than the master unit in which the self device is registered. In addition, the master unit monitoring unit 201 in some embodiments performs the monitoring at "normal situation", only when the monitoring permission flag 215 contained in the configuration information 211 is "0 (permit)".

Moreover, the master unit monitoring unit 201 has a function which sets the standby time 217 in the timer unit 24, and a function which makes the timer unit 24 search lapsed time measure. In addition, the master unit monitoring unit 201 has a function which resets the set standby time 217.

The switching unit 202 has a function which switches the operation mode of the communication terminal device 2 between the master unit operation mode and the slave unit operation mode. The master unit operation mode is the operation mode in which the communication terminal device 2 operates as the master unit. And the slave unit operation mode is the operation mode in which the communication terminal device 2 operates as the slave unit.

While the self device is operating by the master unit operation mode, and when the master unit monitoring unit 201 detects existence of master unit other than the self device, the switching unit 202 switches the master unit operation mode of the self device to the slave unit operation mode, based on the judging criterion information 213 on the self device and the judging criterion information 213 on the master unit other than the self device. More specifically, while operating by the master unit operation mode, and when the coexistence detection signal has been transmitted to the switching unit 202, the switching unit 202 acquires the judging criterion information 213 of the detected master unit from the master unit information 212. The switching unit 202 compares the acquired judging criterion information 213 with the judging criterion information 213 of the self device. When the self device has a low priority as the master unit, the switching unit 202 switches the operation mode of the self device to the slave unit operation mode.

When switching the self device to the slave unit operation mode, the switching unit 202 rewrites the mode identifier 214 of the configuration information 211 to "1". And the switching unit 202 reboots the communication terminal device 2 (self device) promptly.

Moreover, when the time out signal has been transferred from the timer unit 24, the switching unit 202 rewrites the mode identifier 214 to "0", and reboots the communication terminal device 2 (self device) promptly. Thus, the switching unit 202 switches the operation mode of the communication terminal device 2 to the master unit operation mode, when search lapsed time exceeds the standby time 217.

Moreover, when the coexistence detection signal has been transmitted, while operating by the slave unit operation mode, the switching unit 202 acquires the judging criterion information 213 of the detected master unit, and the judging criterion information 213 of the master unit in which the self device has been registered, from the master unit information 212, and compares them. As a result of comparing, when the self device has a low priority as the master unit, the switching unit 202 transmits the master unit switching signal to the communication control unit 200. In addition, the switching unit 202 registers into the blacklist 218 the master unit in which the self device has been registered, when generating the master unit switching signal.

The above is the description of the structure and functions of the information communication system 1. Next, an information communication method by the information communication system 1 is described.

Figure 4:
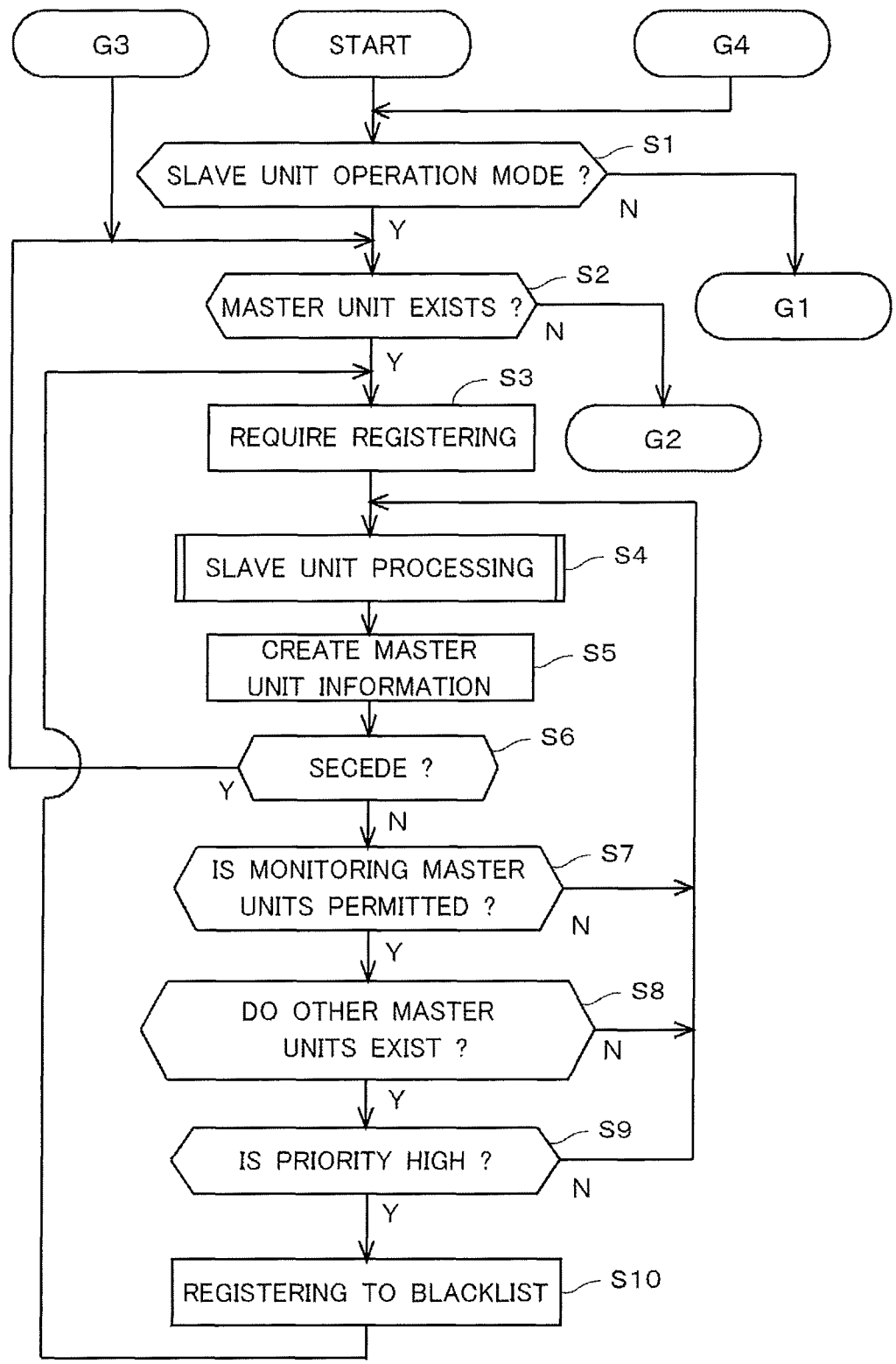
FIG. 4 is a flow chart showing information communication method executing by the information communication system.
Figure 5:
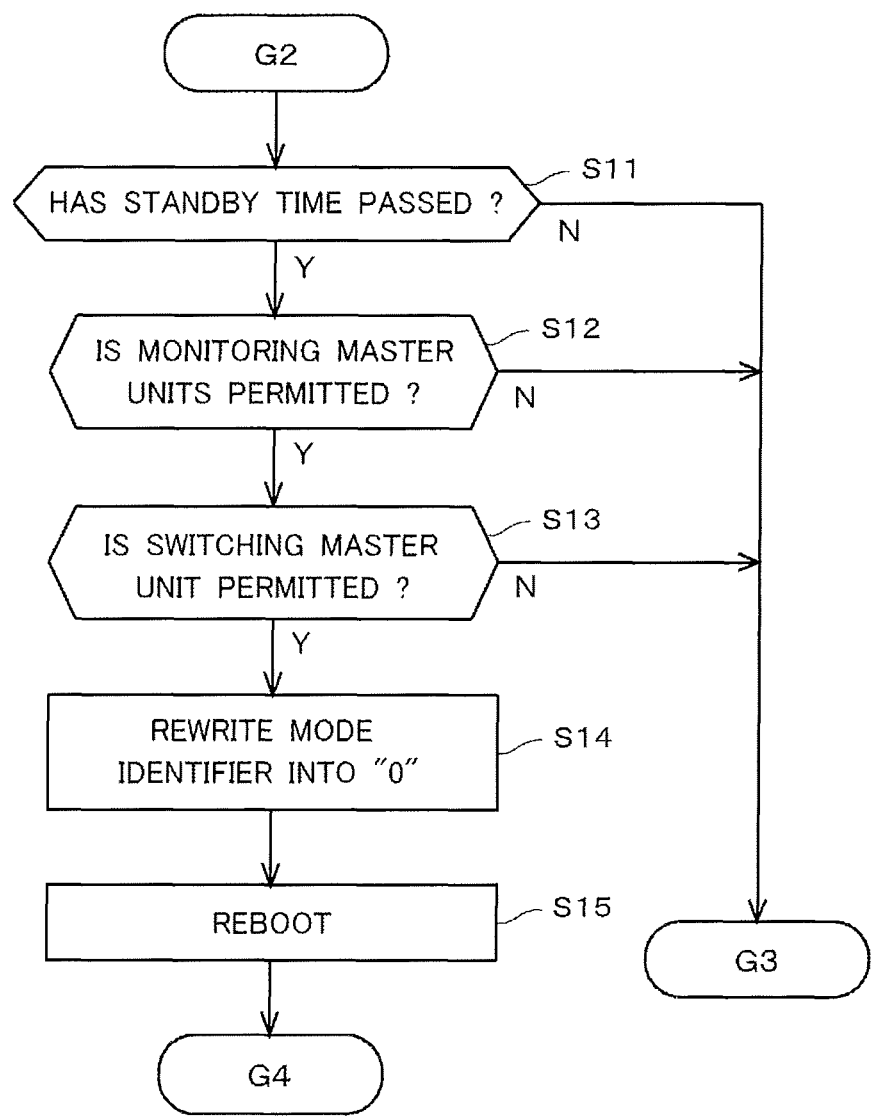
FIG. 5 is a flow chart showing information communication method executing by the information communication system.
Figure 6:
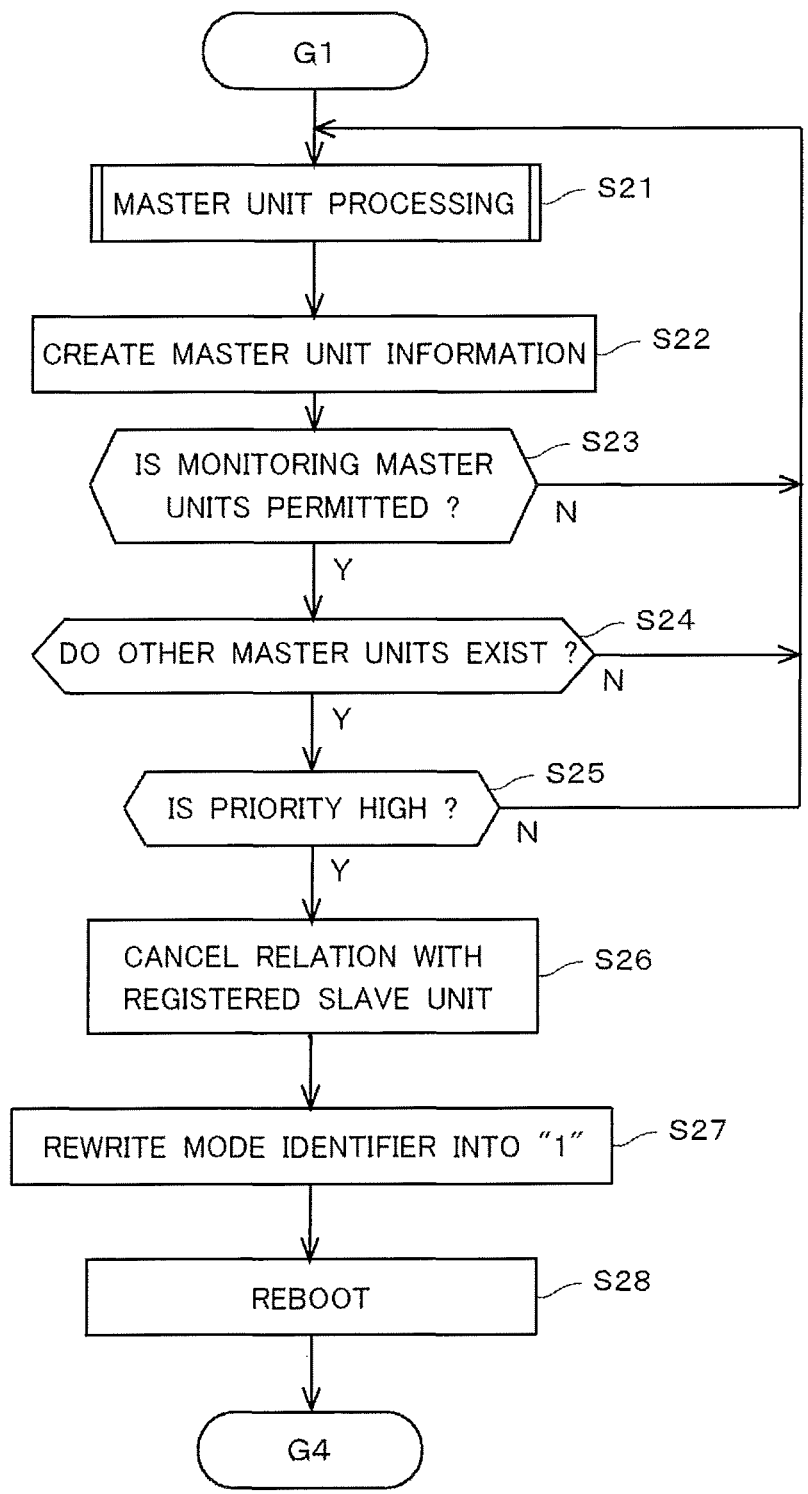
FIG. 6 is a flow chart showing information communication method executing by the information communication system.

FIG. 4, FIG. 5, and FIG. 6 are flowcharts showing the information communication method executing by the information communication system 1. Although not shown in FIG. 4, FIG. 5, and FIG. 6, the configuration information 211 which is needed in each communication terminal device 2, 3, 4, 5, 6, and 7 are created respectively. In addition, the created configuration information 211 are stored in each storage device 21. Moreover, the initial value of the monitoring permission flag 215 and the switching permission flag 216 of the configuration information 211 in each communication terminal device 2, 3, 4, 5, 6, and 7 have been already rewritten by the construction person in charge. It is assumed that before each step shown in FIG. 4, FIG. 5, and FIG. 6 is started, the processes which are described above for example are already completed.

When the processing shown in FIG. 4 is started, the communication terminal device 2 (CPU 20) refers to the mode identifier 214, and judges whether or not to start by slave unit operation mode (Step S1). The judgment in Step S1 is made based on whether the value of the mode identifier 214 is "1" or not.

Because the mode identifier 214 is "0", when not starting by the slave unit operation mode (No in Step S1), the communication terminal device 2 is started by the master unit operation mode. The communication terminal device 2 started by the master unit operation mode performs the processing shown in FIG. 6, but details are described later.

Because the mode identifier 214 is "1", when starting by the slave unit operation mode (Yes in Step S1), the communication terminal device 2 is started by the slave unit operation mode.

When the communication terminal device 2 is started by the slave unit operation mode, the communication terminal device 2 needs to find the master unit on the network 9. Therefore, when the judgment in Step S1 is Yes, the master unit monitoring unit 201 sets the standby time 217 to the timer unit 24, and makes the timer unit 24 start measurement of search lapsed time. Thereby, when the set standby time 217 has passed, in this timing, the timer unit 24 transmits the time out signal to the switching unit 202.

Next, the master unit monitoring unit 201 determines whether the master unit exists on the network 9 by judging whether the information about the master unit has already been created in the master unit information 212 by the communication control unit 200 (Step S2). When the master unit is already detected, the communication control unit 200 has already registered the information about the detected master unit into the master unit information 212 based on the information which the communication unit 25 received. For example, since the known technology can be used, detailed description about the search procedure (creation procedure of the master unit information 212 by the communication control unit 200) of the master unit at the time of starting is omitted.

When existence of the master unit cannot be checked (No in Step S2), the switching unit 202 determines whether the standby time 217 (search lapsed time) has passed by the existence of transfer of the time out signal from the timer unit 24 (Step S11).

The time out signal is not transmitted when the standby time 217 has not passed. Therefore, the switching unit 202 determines to be No in Step S11. In the case, CPU 20 returns to the process of Step S2 and repeats processing. That is, the communication terminal device 2 started by the slave unit operation mode does not switch to the master unit operation mode until the standby time 217 set by performing Step S11 has passed.

As described above, in the communication terminal devices 2, 3, 4, 5, 6, and 7 in some embodiments, the standby time 217 is the sum of a fixed value (common value) and the MAC address of the self device. Therefore, the standby time 217 is set to become a peculiar value of the self device. That is, the timing becoming time out (state where the time which is standby for searching a master unit exceeds the standby time 217) of the search lapsed time in Step S11 differs in each communication terminal device 2, 3, 4, 5, 6, and 7. Therefore, a power supply is supplied to the information communication system 1, and even if each communication terminal device 2, 3, 4, 5, 6, and 7 is started at almost simultaneous timing, it is expected that the timing in which judgement in Step S11 is switched to "Yes" will not be in agreement.

Thereby, when the master unit does not exist on the network 9 (for example, initial state at the time of installation), even if a plurality of the communication terminal devices 2, 3, 4, 5, 6, and 7 start simultaneously, what has the smallest value of the standby time 217 switches to the master unit operation mode first. At least one of the communication terminal devices 2, 3, 4, 5, 6, and 7 switches to the master unit, in other device, the judgment in Step S11 is not switched to "Yes" henceforth (the judgment in Step S2 is switched to "Yes"). Therefore, the information communication system 1 can suppress that the communication terminal devices 2, 3, 4, 5, 6, and 7 are switched to the master unit simultaneously, compared with the case where measures are not taken at all like the known technology.

In some embodiments, what has the smallest value of the standby time 217 (what changes to master unit operation mode first) has the smallest value of the MAC address. And what has the smallest value of the MAC address has the highest priority as the master unit in the information communication system 1 in some embodiments. Thus, if it is set so that what has a high priority as a master unit switches as a master unit earlier, it can also suppress the switch frequency of the master unit in later processing.

It is already described that the standby time 217 in some embodiments is the sum of the fixed value (common value) and the MAC address of the self device. On the other hand, the MAC address of the self device is stored in the configuration information 211 as the judging criterion information 213. Therefore, for example, the storage device 21 stores the common fixed value as the standby time 217. Hereafter, the master unit monitoring unit 201 sets the sum of the standby time 217 and the judging criterion information 213 to the timer unit 24. Thereby, the similar effect can be acquired.

When the standby time 217 has already passed (Yes in Step S11), the switching unit 202 judges whether or not monitoring master units other than the self device is permitted (Step S12). Step S12 is realized that the switching unit 202 refers to the monitoring permission flag 215 and judges whether or not the monitoring permission flag 215 is "0".

When the monitoring permission flag 215 is "1" (No in Step S12), the communication terminal device 2 (the CPU 20) returns to the processing from Step S2. In this case, the switching unit 202 does not switch the operation mode of the communication terminal device 2 to the "master unit operation mode".

The communication terminal device 2 in some embodiments has a function which monitors existence of master units other than the self device, when the self device operates with the master unit operation mode. As result of monitoring, when the device in which the priority as the master unit is higher than the self device has been detected as the master unit, in order to cancel coexistence of master units, the communication terminal device 2 switches to the slave unit operation mode.

However, if the communication terminal device 2 to which the function which monitors existence of master units other than the self device is not permitted has been switched to the master unit operation mode, naturally this communication terminal device 2 cannot monitor existence of master units other than the self device. Even if a plurality of master units have been in an existence state, the communication terminal device 2 which does not detect coexistence of master units does not shift to the slave unit operation mode. Therefore, when the function which monitors existence of master units other than the self device is not permitted by Step S12, the communication terminal device 2 is restricted so that the self device may not shift to the master unit operation mode.

Thereby, the information communication system 1 can prevent disorderly increasing of master units on the network 9. In addition, instead of providing the judgment of Step S12, when switching to the master unit operation mode, the additional process of rewriting the value of the monitoring permission flag 215 to "0" may be provided. In this case, the situation which the master units increase temporarily for a certain reason may arise. However, since the low priority communication terminal device 2 switches to the slave unit operation mode automatically with progress of time, the state where a plurality of master units exist is canceled.

When the monitoring permission flag 215 is "0" (Yes in Step S12), the switching unit 202 judges further whether the switching of operation mode is permitted (Step S13). Step S13 is realized that the switching unit 202 refers to the switching permission flag 216 and judges whether or not the switching permission flag 216 is "0".

When the switching permission flag 216 is "1" (No in Step S13), the communication terminal device 2 (the CPU 20) returns to the processing from Step S2. In this case, the switching unit 202 does not switch the operation mode of the communication terminal device 2 to the "master unit operation mode".

Thus, in the information communication system 1, the propriety of the switching of operation mode is beforehand determined by using the switching permission flag 216 to each communication terminal device 2, 3, 4, 5, 6, and 7. And when the switching unit 202 checks this determination (switching permission flag 216) suitably, it can be suppressed the disorderly switching of the operation mode of the communication terminal devices 2, 3, 4, 5, 6, and 7.

According to the past description, the following things are understood. When all the communication terminal devices 2, 3, 4, 5, 6, and 7 are installed in the state in which both of the monitoring permission flag 215 and the switching permission flag 216 are initial values ("1"), the communication terminal devices 2, 3, 4, 5, 6, and 7 which switch to the master unit operation mode does not appear. Therefore, when installing the information communication system 1, a construction person in charge needs to choose at least one of the communication terminal devices 2, 3, 4, 5, 6, and 7, and needs to change the value of the monitoring permission flag 215 and the switching permission flag 216 into "0".

For example, such work (change the values into "0") is possible when the construction person in charge operates the operation unit 22 of the communication terminal device 2. That is, the information communication system 1 requires a setup by the construction person in charge at the time of installation. It may force a burden upon the construction person in charge.

Here, the point which both sets the initial value of the monitoring permission flag 215 and the switching permission flag 216 to "1 (not permit)" is explained.

The information communication system 1 is designed to constitute one network. Therefore, in a normal state, the number of the master units is wanted to be one. In spite of it, when it is admitted that all the communication terminal devices 2, 3, 4, 5, 6, and 7 operate as the master unit, the fear that it becomes easy to produce such situation where the master unit coexists occurs according to increase of the device admitted. Even if narrowing down to one master unit is carried out automatically, meanwhile, the information communication system 1 may become a situation which cannot do the usual data communications, it is not desirable.

Moreover, in the situation where all the communication terminal devices 2, 3, 4, 5, 6, and 7 can switch as the master unit, even if finally narrowed down to one device, there is a problem that the final master unit is indefinite. In the information communication system 1, when the device which is not designed becomes the master unit, there is a possibility that the performance which has been planned at the beginning may not be realized.

Moreover, the information communication system 1 in some embodiments assumes the business use system installed in an office building etc. It is accompanied by comparatively large-scale construction to install such the information communication system 1. Therefore, those who perform such installation are not a general user but construction persons in charge who usually have special knowledge. That is, it is assumed that the construction person in charge who is a specialist attends at installation of the information communication system 1. Even if the construction person in charge is burdened with the setting work (work which rewrites the initial value of the flag) to at least one of the communication terminal devices 2, 3, 4, 5, 6, and 7, compared to the case that a general user is burdened with the same work, it does not become so big a burden.

Therefore, as described above, in the communication terminal devices 2, 3, 4, 5, 6, and 7 of the information communication system 1 in some embodiments, the initial values of the monitoring permission flag 215 and the switching permission flag 216 are both set to "1 (not permit)". In addition, the information communication system 1 is constituted so that the construction person in charge may perform the setup at the time of installation. As already described above, the setup is ended by the time the processes shown in FIG. 4, FIG. 5, and FIG. 6 are started.

However, it is possible to consider that the purpose of easing burden of a construction person in charge is more important. In that case, what is necessary is to set the initial values of the monitoring permission flag 215 and the switching permission flag 216 to "0", in all the communication terminal devices 2, 3, 4, 5, 6, and 7 of the information communication system 1. When constituted in this way, the construction person in charge in particular does not need to perform the setup. When sufficient time passes, the information communication system 1 becomes in the state where at least one of the communication terminal devices 2, 3, 4, 5, 6, and 7 is operating by the master unit operation mode.

Moreover, as described above, the information communication system 1 in some embodiments is assumed as the business use system. However, the present invention is not limited to the business use system. It is also applicable to the home use system.

Returning to FIG. 5, when the switching permission flag 216 is "0" (Yes in Step S13), the switching unit 202 rewrites the mode identifier 214 to "0" (Step S14). And after rewriting the mode identifier 214, the switching unit 202 reboots the communication terminal device 2 promptly (Step S15). The communication terminal device 2 rebooted by Step S15 returns to the process of Step S1 shown in FIG. 4.

As already explained, even if the communication terminal device 2 is rebooted, the set value to the mode identifier 214 is not lost. Therefore, since the mode identifier 214 is set to "0", when Step S1 is performed immediately after performing Steps S14 and S15, the judgment is "No". The processing after being judged to be "No" in Step S1 is mentioned later.

Next, the case where the decision in Step S2 of FIG. 4 is judged Yes, is explained. In the case where the decision result is Yes in Step S2, the result shows that the communication terminal device 2 is the slave unit operation mode and the master unit exists.

In addition, even if it is once a case where existence of the master unit has been detected, when the detected master unit exists in the blacklist 218, the communication terminal device 2 treats this master unit as not existing. That is, although illustration is omitted, Step S2 also includes the processing which checks the blacklist 218. Therefore, in a case where the decision result is Yes in Step S2 is closely a case where the master unit which is not registered in the blacklist 218 exists on the network 9.

When the decision result is Yes in Step S2, the communication control unit 200 controls the communication unit 25, and makes the communication unit 25 transmit the packet which requires registering the self device as the slave unit to the detected master unit. Thereby, a registration demand from the communication terminal device 2 is carried out to the master unit (Step S3).

In addition, the master unit detected in Step S2 is the master unit detected by the method which is called "first come, first served". That is, even if two or more master units already exist on the network 9, the master unit in which the registration demand is carried out in Step S3 at this time is the master unit most detected early in the communication terminal device 2. However, by the communication terminal device 2, when two or more master units are already detected, superiority or inferiority of master units may be able to determine according to the number of times of hop, communication quality, etc.

When Step S3 is performed and the communication terminal device 2 has been safely registered in the master unit, the communication terminal device 2 starts the processing (slave unit processing) as the slave unit (Step S4). In other words, the communication terminal device 2 functions like the slave unit in PLC on the network 9 by performing Step S4.

In addition, in the state where the communication terminal device 2 has been registered in a new master unit, does not require registration to another master unit. That is, after the communication terminal device 2 has been registered in a normal master unit, a possibility that it may be again registered in the master unit (unsuitable master unit) which has been registered in the blacklist 218 reduces. Therefore, the communication terminal device 2 may delete the master unit registered in the blacklist 218, when the self device has been registered in a new master unit. However, the timing of deletion from the blacklist 218 is not limited to this. The communication terminal device 2 may delete the master unit from the blacklist 218, when predetermined time has passed, after registering the master unit to the blacklist 218. As the other method, the communication terminal device 2 may clear the blacklist 218, when even one master unit is not detected.

Next, the communication terminal device 2 creates (updates) the master unit information 212 based on the information received in Step S4 (Step S5).

In addition, the communication terminal device 2 may require and collect the information which is not acquired by the conventional slave unit processing (Step S4) in Step S5. That is, the master unit information 212 is not limited to the information acquired at Step S4. For example, a situation which the judging criterion information 213 of the master unit on the network 9 is not acquired only by the conventional slave unit processing, may be assumed. In such a situation, the communication terminal device 2 may require the master unit to transmit the judging criterion information 213, and may create the master unit information 212 based on the information (obtained in Step S5) acquired as a response to this.

Further, in the slave unit processing which is the conventional technology, the processing in which the information about the master unit is collected, and the processing in which the database about a master unit is created may be performed. Thus, the information created in the conventional technology is useable as the master unit information 212. That is, in a case that the master unit information 212 is completed in Step S4, Step S5 does not need to be performed separately and independently.

Moreover, although the details will be described later, the communication terminal device 2 repeats Steps S4 and S5, and performs. However, the new information which the communication terminal device 2 should make the master unit information 212 in the timing which performs Step S5 does not necessarily exist. Therefore, when the communication terminal device 2 judges that the necessity information has not been acquired, the communication terminal device 2 may not create (update) the master unit information 212 in Step S5.

When Step S5 has been performed, the communication terminal device 2 judges whether the communication terminal device 2 secedes from the network 9 (Step S6).

When seceding (Yes in Step S6), the communication terminal device 2 gives notice of seceding to the master unit of the self device (a secession packet is transmitted to the master unit). Thereby, the communication terminal device 2 is deleted from the slave unit list of the master unit in which the self device has been registered as the slave unit. The communication terminal device 2 which has seceded returns to Step S2, and starts search of a new master unit. In addition, when seceding, the communication terminal device 2 may register into the blacklist 218 the master unit in which the self device has been registered before seceding.

When the communication terminal device 2 does not secede (No in Step S6), the master unit monitoring unit 201 judges whether the monitoring processing of master units other than the self device is permitted (Step S7). Step S7 is realizable when the master unit monitoring unit 201 refers to the monitoring permission flag 215 and judges whether the monitoring permission flag 215 is "0".

When the monitoring permission flag 215 is "1" (No in Step S7), the communication terminal device 2 (CPU 20) returns to Step S4, and performs the slave unit processing. In this case, the communication terminal device 2 does not check whether other master units exist in addition to the master unit in which the self device has been registered. Thus, the information communication system 1 can reduce the overhead which is generated by usually monitoring other master units according to setting the monitoring permission flag 215 in the communication terminal device 2.

When the monitoring permission flag 215 is "0" (Yes in Step S7), the master unit monitoring unit 201 refers to the master unit information 212, and checks whether other master units exist in addition to the master unit in which the self device is registered (Step S8). The processing of Step S8 can be performed referring to the master unit information 212 created in Step S5 (and/or in Step S4).

In this manner, the communication terminal device 2 checks whether other master units exist besides the master unit in which the self device has been registered. That is, the communication terminal device 2 detects that two or more master units exist on the network 9. In addition, the processing of Step S8 may include the processing in which the communication terminal device 2 searches other master units according to transmitting a new packet. That is, for the judgment in Step S8, depending to only the master unit information 212 created in Step S5 is not necessary.

When no other master unit exists (No in Step S8), the communication terminal device 2 (CPU 20) returns to Step S4, and performs the slave unit processing. In this case, the communication terminal device 2 does not change the master unit in which the self device has been registered. Thus, the communication terminal device 2 continues the usual slave unit processing, when other master units do not exist other than the master unit in which the self device has been registered (when the coexistence state of the master unit has not arisen).

When other master units exist (Yes in Step S8), the master unit monitoring unit 201 transmits the coexistence detection signal to the switching unit 202. When the coexistence detection signal has been transmitted while operating by the slave unit operation mode, the switching unit 202 acquires the judging criterion information 213 of all the coexisting master units respectively from the master unit information 212, and compares them. And the switching unit 202 judges whether the master unit in which the priority is higher than the master unit in which the self device has been registered exists (Step S9). As already explained, in some embodiments, the judging criterion information 213 is the MAC address, and the device has high priority as the master unit in ascending order of the MAC address.

In a case of No in Step S9, the communication terminal device 2 (CPU 20) returns to Step S4, and performs the slave unit processing. In this case, the communication terminal device 2 does not change the master unit in which the self device has been registered. Thus, the communication terminal device 2 continues the usual slave unit processing, when the master unit in which the priority is higher than the master unit in which the self device has been registered does not exist in others.

In a case of Yes in Step S9, the switching unit 202 generates the master unit switching signal and transmits it to the communication control unit 200, and registers master units except the master unit which has the highest priority into the blacklist 218 (Step S10). In addition, the communication control unit 200 to which the master unit switching signal has been transmitted controls the communication unit 25 to transmit and receive the packet to cancel a relation with the registered master unit. Thereby, the relation between the communication terminal device 2 and low priority master unit is canceled.

When Step S10 has been performed, the communication terminal device 2 returns to Step S3. In Step S3 at this time, the communication terminal device 2 (communication control unit 200) requires registering the self device as the slave unit to the highest master unit of the priority.

In addition, the highest master unit of the priority may be transmitted to the communication control unit 200 from the switching unit 202, with the master unit switching signal. On the other hand, since all low priority master units are being registered in the blacklist 218, the communication control unit 200 may only broadcast the registration demand packet.

Thus, the information communication system 1 registers the slave unit into the master unit of the high priority as the master unit, without waiting for release from the master unit, when the situation where two or more master units exist has been detected. It shortens time which is necessary to establish communication between new master unit and the slave unit. Therefore, the restoration time for the slave unit which changes the master unit is shortened.

The description to here has mentioned mainly to processing in which the communication terminal device 2 operates by the slave unit operation mode. Next, processing in which the communication terminal device 2 operates by the master unit operation mode is described. The case where the communication terminal device 2 operates by the master unit operation mode is a case where it has been judged No in Step S1 shown in FIG. 4. And the case where it has been judged No in Step S1 is a case where the mode identifier 214 is "0", when the communication terminal device 2 starts.

In the case where it has been judged to be No in Step S1, the communication terminal device 2 (CPU 20) performs master unit processing (Step S21). And after the master unit processing is completed, the communication control unit 200 creates (updates) the master unit information 212 (Step S22). The processing in Step S22 is the same as it in Step S5.

Next, the master unit monitoring unit 201 judges whether the processing in which the master unit monitoring unit 201 monitors master units except the self device is permitted (Step S23). Like Step S7, Step S23 is realizable, when the master unit monitoring unit 201 refers to the monitoring permission flag 215 and judges whether the monitoring permission flag 215 is "0".

When the monitoring permission flag 215 is "1" (No in Step S23), the communication terminal device 2 (CPU 20) returns to Step S21, and performs the master unit processing. In this case, the communication terminal device 2 does not check whether other master units exist in addition to the master unit in which the self device has been registered. Thus, the information communication system 1 can reduce the overhead which is generated by usually monitoring other master units according to setting the monitoring permission flag 215 in the communication terminal device 2.

When the monitoring permission flag 215 is "0" (Yes in Step S23), the master unit monitoring unit 201 refers to the master unit information 212, and checks whether other master units exist in addition to the self device (Step S24). The processing in Step S24 can be performed to the master unit information 212 created in Step S22 (and/or in Step S21).

In this manner, the communication terminal device 2 checks whether other master units exist besides the self device. That is, the communication terminal device 2 detects that two or more master units exist on the network 9. In addition, like Step S8, the processing of Step S24 may include the processing in which the communication terminal device 2 searches other master units according to transmitting a new packet. That is, for the judgment in Step S24, depending to only the master unit information 212 created in Step S22 is not necessary.

When no other master unit exists (No in Step S24), the communication terminal device 2 (CPU 20) returns to Step S21, and performs the master unit processing. In this case, the communication terminal device 2 does not switch the master unit operation mode. Thus, the communication terminal device 2 continues the usual master unit processing, when other master units do not exist other than the self device (when the coexistence state of the master unit has not arisen).

When other master units exist (Yes in Step S24), the master unit monitoring unit 201 transmits the coexistence detection signal to the switching unit 202. When the coexistence detection signal has been transmitted while operating by the master unit operation mode, the switching unit 202 acquires the judging criterion information 213 of all the master units other than the self device respectively from the master unit information 212, and compares them with the judging criterion information 213 registered in the configuration information 211 of the self device. And the switching unit 202 judges whether the master unit in which the priority is higher than the self device exists (Step S25).

In a case of No in Step S25, the communication terminal device 2 (CPU 20) returns to Step S21, and performs the master unit processing. In this case, the communication terminal device 2 does not switch to the slave unit operation mode. Thus, the communication terminal device 2 continues the usual master unit processing, when the master unit in which the priority is higher than the self device does not exist in others.

Thereby, in the information communication system 1, the switching to the slave unit operation mode of the master unit with the highest priority is being forbidden. Therefore, for example, even if all the communication terminal devices 2, 3, 4, 5, 6, and 7 are permitted to switch to the slave unit operation mode, unless it is also unexpected situations (e.g. broken), at least one master unit is continued to exist.

In a case of Yes in Step S25, the switching unit 202 generates the master unit switching signal and transmits it to the communication control unit 200. In addition, the communication control unit 200 to which the master unit switching signal has been transmitted controls the communication unit 25 to transmit and receive the packet to cancel a relation with all the registered slave unit. Thereby, the communication terminal device 2 cancels a relation with the registered slave unit (Step S26).

When Step S26 has been performed, the switching unit 202 rewrites the mode identifier 214 into "1" (Step S27), and reboots the communication terminal device 2 (Step S28).

When the communication terminal device 2 is rebooted by Step S28, the communication terminal device 2 returns to Step S1. In Step S1 performed at this time, the mode identifier 214 is "1". Therefore, the communication terminal device 2 is started by the slave unit operation mode, and is judged to be Yes in Step S1.

The above is description of the information communication method by the information communication system 1. Next description, by applying the information communication method, gives and explains an example about how the operation mode of the communication terminal devices 2, 3, 4, 5, 6, and 7 are switched, in the information communication system 1.

FIGS. 7 to 16 shows switching state of the operation mode of communication terminal devices 2, 3, 4, 5, 6, and 7.

In addition, in FIGS. 7 to 16, squares show the communication terminal devices 2, 3, 4, 5, 6, and 7.

Moreover, the numbers shown in the squares in FIGS. 7 to 16 show the reference signs of each communication terminal devices 2, 3, 4, 5, 6, and 7. That is, "2" shows that the square is the communication terminal device 2.

Moreover, the alphabets in FIGS. 7 to 16 show the mode identifier 214 of each communication terminal devices 2, 3, 4, 5, 6, and 7. That is, "M (master)" indicates that the mode identifier 214 is "0", and "T (terminal)" indicates that the mode identifier 214 is "1".

Moreover, in FIGS. 7 to 16, the communication terminal devices 2, 3, and 6 which attached the asterisk show that the switching to the master unit operation mode is being permitted. On the other hand, the communication terminal devices 4, 5, and 7 to which the asterisk is not attached show that the switching to the master unit operation mode is not being permitted. In addition, in the example shown in FIGS. 7 to 16, in all the communication terminal devices 2, 3, 4, 5, 6, and 7, the monitoring permission flag 215 is being set to "0". Therefore, the monitoring of the master unit is being permitted in all the communication terminal devices 2, 3, 4, 5, 6, and 7.

Moreover, in FIGS. 7 to 16, the squares where hatching is not carried out show the state where the registration as a master unit or a slave unit has not been completed (unregistered state). On the other hand, the squares where hatching was carried out show the state where the registration as a master unit or a slave unit has been completed (however, it is not necessarily in a final registration state.). Moreover, the squares where the same hatching was carried out show that they belong to the group of a common master unit.

Furthermore, in the example shown in FIGS. 7 to 16, each MAC address of the communication terminal devices 2, 3, 4, 5, 6, and 7 are reference signs of each device. That is, the MAC address of the communication terminal device 2 is explained as "2".

Figure 7:
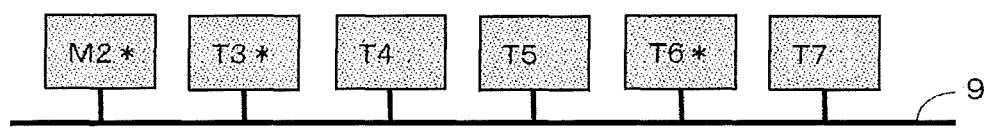
FIG. 7 is a block diagram showing switching state of operation modes of the communication terminal devices.

FIG. 7 shows that the communication terminal device 2 is being registered as the master unit, and other communication terminal devices 3, 4, 5, 6, and 7 are being registered as the slave unit. In the other words, FIG. 7 shows that only the communication terminal device 2 exists as one master unit, in the information communication system 1. That is, FIG. 7 shows the state where the PLC network is already completed.

Figure 8:
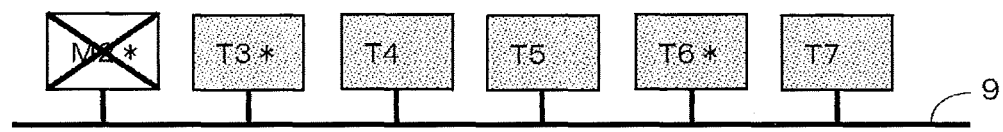
FIG. 8 is a block diagram showing switching state of the operation modes of the communication terminal devices.

FIG. 8 shows a case where the communication terminal device 2 which was the master unit has broken from the state shown in FIG. 7. As for the communication terminal device 2, by trouble state, transmission of the Hello packet as the master unit processing becomes impossible.

Figure 9:
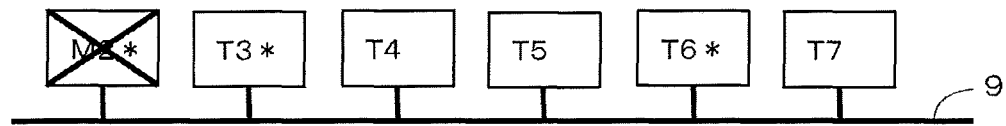
FIG. 9 is a block diagram showing switching state of the operation modes of the communication terminal devices.

FIG. 9 shows the state where the registration in the workable communication terminal devices 3, 4, 5, 6, and 7 has been canceled by trouble of the communication terminal device 2. When the communication terminal device 2 which is the master unit has broken down, the communication terminal devices 3, 4, 5, 6, and 7 which are the slave unit operation mode detect isolated state after predetermined time has passed. In this case, in Step S6 shown in FIG. 4, for example, it judges to be "Yes", and secedes from a registration state. Thereby, the relation between the communication terminal device 2 and the other devices are canceled, and the communication terminal devices 3, 4, 5, 6, and 7 become unregistered state, as shown in FIG. 9.

The communication terminal devices 3, 4, 5, 6, and 7 which are unregistered state start to search a master unit, and they are in the standby state until a new master unit is detected. In other words, it is in the state of repeating Step S2 shown in FIG. 4 and Step S11 shown in FIG. 5.

Since switch to the master unit operation mode is permitted, the communication terminal devices 3 and 6 switch to the master unit, when the standby time 217 which has been set has passed. On the other hand, since switch to the master unit operation mode is not permitted, the communication terminal devices 4, 5, and 7 do not switch to the master unit, and they maintain the standby state until the master unit is found.

Figure 10:
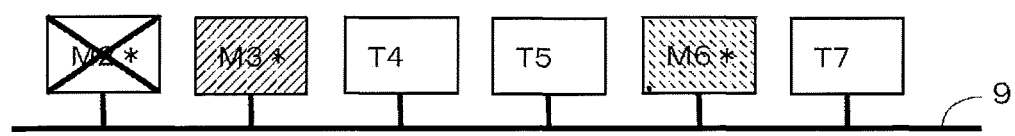
FIG. 10 is a block diagram showing switching state of the operation modes of the communication terminal devices.

FIG. 10 shows the state where the communication terminal devices 3 and 6 both switched to the master unit. In the information communication system 1, the difference is prepared in the standby time 217 so that a time lag may arise in the timeout in the communication terminal device 3 and the communication terminal device 6. Therefore, the communication terminal device 3 with the short standby time 217 becomes timeout earlier than the communication terminal device 6. Thus, the communication terminal device 3 switches to the master unit operation mode earlier than the communication terminal device 6.

When the communication terminal device 6 detects the communication terminal device 3 which switched to the master unit operation mode before timeout of the self device, the communication terminal device 6 does not switch to the master unit operation mode. In that case, the network is completed in the state in which only the communication terminal device 3 has become a master unit. Thus, in the information communication system 1, when a situation shifts ideally, the state where two or more master units coexist does not arise.

However, in the information communication system 1, the information which is transmitted is relayed (hopping) by each communication terminal device, and spreads. In the case of the network 9 which adopted such a communication technique, it takes time comparatively for the information which indicates the communication terminal device 3 has shifted to the master unit operation mode to reach the communication terminal device 6. Therefore, when the communication terminal device 6 becomes timeout by the time the information which indicates the communication terminal device 3 is a master unit reaches the communication terminal device 6, the communication terminal device 6 also shifts to the master unit operation mode, and it is in the state which shows in FIG. 10.

That is, although the information communication system 1 can reduce the situation of coexistence of two or more master units compared with the known technology, it cannot prevent this completely.

Figure 11:
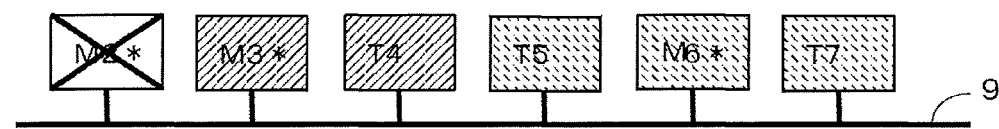
FIG. 11 is a block diagram showing switching state of the operation modes of the communication terminal devices.

FIG. 11 shows the situation where registration of the slave unit by the communication terminal devices 3 and 6 which are both master unit advanced.

The slave unit in the information communication system 1 registers the transmitting origin of the Hello packet which arrived earliest as the master unit. Therefore, the arrival timing of the Hello packet determines the master unit. In the example shown here, the communication terminal device 4 near the communication terminal device 3 is being registered in the communication terminal device 3, and the communication terminal devices 5 and 7 near the communication terminal device 6 are being registered in the communication terminal device 6.

In PLC in some embodiments, it is possible to receive the information from the slave unit belonging to a different master unit. However, the information received from the slave unit belonging to a different master unit is not transmitted to other addresses. For example, when the communication terminal device 4 transmits information towards the communication terminal device 6 or the communication terminal device 7, the information transmitted from the communication terminal device 4 is received by the communication terminal device 5, but it is not transmitted towards the communication terminal device 6 or the communication terminal device 7. That is, the communication terminal device 5 does not function as a relay machine between the communication terminal device 4 and the communication terminal device 6 or the communication terminal device 7. Thus, the network 9 is divided by each master unit if two master units exist on the network 9.

However, on the boundary of the divided network, the information from both of master units is receivable. In the example shown in FIG. 11, the communication terminal device 4 can receive the information from the communication terminal device 5 registered in the different master unit from the self device. Similarly, the communication terminal device 5 can receive the information from the communication terminal device 4. Thus, since the communication terminal devices 4 and 5 can receive the information from master units other than the master unit in which the self device is registered, they can create the master unit information 212 about master units other than the master unit in which the self device is registered based on the received information.

Moreover, since the monitoring permission flag 215 has been set to "0 (permit)", in the case of Yes in Step S7, the communication terminal devices 4 and 5 check existence of other master units (Step S8). In addition, in the example shown here, "other master unit" is the communication terminal device 6 about the communication terminal device 4, and is the communication terminal device 3 about the communication terminal device 5.

As already described, the communication terminal devices 4 and 5 create the master unit information 212 about master units other than the master unit in which the self device is registered. Therefore, if the state which shows in FIG. 11 continues beyond a definite period of time, the communication terminal devices 4 and 5 detect other master units, and give Yes as the result in judgement in Step S8. That is, the master unit monitoring unit 201 of the communication terminal devices 4 and 5 generates the coexistence detection signal.

In the communication terminal devices 4 and 5, the switching unit 202 to which the coexistence detection signal has been delivered judge whether other master unit has the priority as the master unit higher than the master unit in which the self device is registered (Step S9). In Step S9, the priority of the communication terminal device 3 and the priority of the communication terminal device 6 is compared with each other.

In the example shown here, the MAC address (judging criterion information 213) of the communication terminal device 3 is "3", and the MAC address (judging criterion information 213) of the communication terminal device 6 is "6". Therefore, the priority as the master unit of the communication terminal device 3 is higher. Therefore, when Step S9 is performed, the communication terminal device 4 judges No, and the communication terminal device 5 judges Yes.

The communication terminal device 4 which judged No in Step S9 maintains the relation with the communication terminal device 3. On the other hand, the communication terminal device 5 which judged Yes in Step S9 cancels the relation with the communication terminal device 6, and registers the communication terminal device 6 into the blacklist 218.

Figure 12:
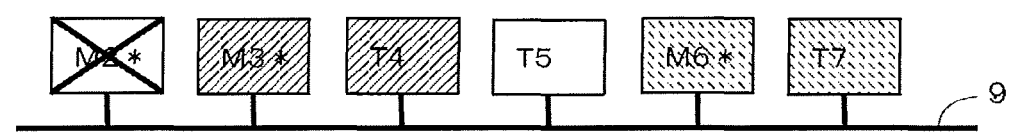
FIG. 12 is a block diagram showing switching state of the operation modes of the communication terminal devices.

FIG. 12 shows that the communication terminal device 5 cancels a relation with the communication terminal device 6, and has shifted into the unregistered state. Moreover, as shown in FIG. 12, since the communication terminal device 4 maintains the relation with the communication terminal device 3, it remains in the group of the communication terminal device 3. Furthermore, the communication terminal device 6 is still operating by the master unit operation mode, and is registering the communication terminal device 7 as the slave unit.

Shifting into the state shown in FIG. 12, the communication terminal device 5 which canceled the relation with the communication terminal device 6 performs Step S3 and requires registration to the communication terminal device 3 whose priority as the master unit has been judged high.

Figure 13:
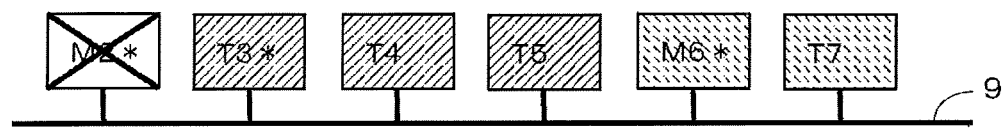
FIG. 13 is a block diagram showing switching state of the operation modes of the communication terminal devices.

FIG. 13 shows the state where the communication terminal device 3 registered the communication terminal device 5 as the slave unit, by the registration demand from the communication terminal device 5. The communication terminal device 5 is expressed by the same hatching as the communication terminal devices 3 and 4. The network shown in FIGS. 11 and 12 constituted by the communication terminal devices 3 and 4 is shifting to the network constituted by the communication terminal devices 3, 4, and 5. That is, the communication terminal device 5 is taken into the group of the high communication terminal device 3 of the priority as the master unit. However, in the state which shows in FIG. 13, the communication terminal device 6 is still operating by the master unit operation mode, and is registering the communication terminal device 7 as the slave unit.

As for the communication terminal device 6, the monitoring permission flag 215 is being set to "0 (permit)". Therefore, it judges Yes in Step S23 (FIG. 6) performing repeatedly, and it is further judged whether other master units exist in addition to the self device (Step S24).

When the communication terminal device 5 starts the operation as the slave unit of the communication terminal device 3 as shown in FIG. 13, the Hello packet from the communication terminal device 3 is transmitted by the communication terminal device 5, and comes to arrive at the communication terminal device 6. Thereby, the communication terminal device 6 creates the master unit information 212 about the communication terminal device 3. If the master unit information 212 about the communication terminal device 3 has been created, the communication terminal device 3 as other master units will be detected in Step S24. That is, the communication terminal device 6 detects the coexistence state of two or more master units, and generates the coexistence detection signal by the master unit monitoring unit 201.

When the coexistence detection signal is generated, the switching unit 202 of the communication terminal device 6 performs Step S25, and judges whether the newly detected communication terminal device 3 has the higher priority as the master unit than the self device. As already described, in the example shown here, the priority as the master unit of the communication terminal device 3 is higher than that of the communication terminal device 6. Therefore, the communication terminal device 6 gives Yes as the result in judgement in Step S25.

Thereby, the communication terminal device 6 cancels registration of all the slave units (communication terminal device 7) (Step S26). In addition, the communication terminal device 6 sets "1" to the mode identifier 214 (Step S27), and reboots (Step S28).

Figure 14:
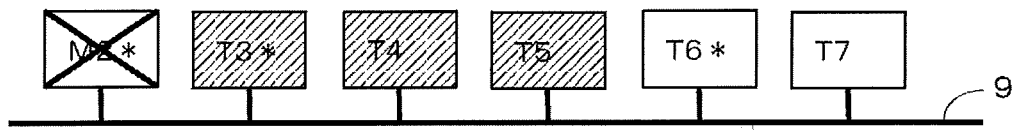
FIG. 14 is a block diagram showing switching state of the operation modes of the communication terminal devices.

FIG. 14 shows the state where the communication terminal device 6 has started by reboot. The mode identifier 214 of the communication terminal device 6 is already rewritten to "1". Therefore, as shown in FIG. 14, it is understood that the alphabet of the communication terminal device 6 has become to "T" and the communication terminal device 6 has switched to the slave unit operation mode. Moreover, at the time shown in FIG. 14, since the communication terminal device 6 has not yet carried out the registration demand to the master unit, it is in an unregistered state. Furthermore, since the communication terminal device 6 canceled the relation with the communication terminal device 7, the communication terminal device 7 is also unregistered.

Shifting into the state shown in FIG. 14, the communication terminal device 6 which has become unregistered performs Step S3 and requires registration to the communication terminal device 3 which has been judged to have high priority as the master unit. On the other hand, the communication terminal device 7 canceled by the communication terminal device 6 performs Step S2, and starts search of the master unit. In addition, when the communication terminal device 6 has lost the information about the communication terminal device 3 by reboot, the communication terminal device 6 as well as the communication terminal device 7 performs Step S2.

Figure 15:
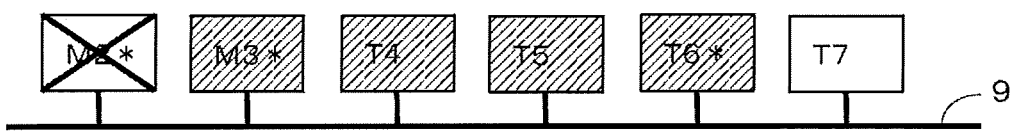
FIG. 15 is a block diagram showing switching state of the operation modes of the communication terminal devices.

FIG. 15 shows the state where the communication terminal device 6 has been registered to the communication terminal device 3 as the slave unit. In FIG. 15, the communication terminal device 6 is expressed by the same hatching as the communication terminal devices 3, 4, and 5. Therefore, it is understood that the communication terminal device 6 has been included in the same network as the communication terminal devices 3, 4, and 5.

Generally speaking, the communication terminal device 6 which has already detected the master unit, shifts previously to the registration state compared with the communication terminal device 7 started from search. Moreover, in the example shown here, the Hello packet from the communication terminal device 3 does not arrive to the communication terminal device 7 unless the communication terminal device 6 transfers it. Therefore, the communication terminal device 7 does not detect the communication terminal device 3. Therefore, in the example shown in FIG. 15, although the communication terminal device 6 is in a registration state, the communication terminal device 7 is in an unregistered state.

As shown in FIG. 15, when the communication terminal device 6 starts the operation as the slave unit of the communication terminal device 3, the Hello packet from the communication terminal device 3 is transferred by the communication terminal device 6, and comes to arrive at the communication terminal device 7. Thereby, the communication terminal device 7 as well as the communication terminal devices 5 and 6 described above is registered as the slave unit of the communication terminal device 3.

Figure 16:
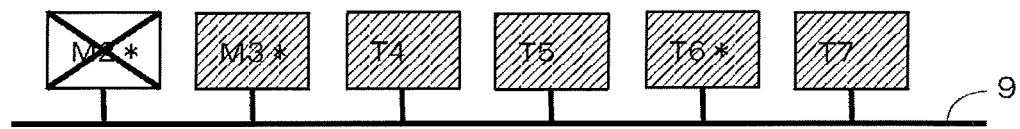
FIG. 16 is a block diagram showing switching state of the operation modes of the communication terminal devices.

FIG. 16 shows the state that time passed enough since break of the communication terminal device 2. Although it is understood clearly by comparing FIG. 7 to FIG. 16, at first, the network where only the communication terminal device 2 operates as the master unit shifts safely to the network where only the communication terminal device 3 operates as the master unit, and network division has not arisen.

Moreover, while shifting to the state shown in FIG. 16 finally from the state shown in FIG. 7, though the coexistence of master units (communication terminal devices 3 and 6) arisen once (FIG. 11), it is also understood that the information communication system 1 cancels this automatically. That is, the data communications by the communication terminal devices 3, 4, 5, 6, and 7 which are not out of order are recovered automatically, without a specialized construction person in charge rushing to the spot, even if the emergency of break of the master unit (communication terminal device 2) arises.

In addition, the information communication system 1 has been prepared the difference in the standby time 217 in each communication terminal device 2, 3, 4, 5, 6, and 7. Thereby, if timeout does not arise in the communication terminal device 6, the coexistence state of the master unit as shown in FIG. 11 does not arise. In that case, the information communication system 1 shifts promptly in the state which shows in FIG. 16.

Moreover, in the example shown here, the two communication terminal devices 3 and 6 explained with the example which switches to the master unit operation mode. However, even if more devices switch to the master unit operation mode, the information communication system 1 becomes the state where only one master unit eventually exists as shown in FIG. 16, by repeating the same processing.

As described above, the information communication system 1 in some embodiments includes the plurality of communication terminal devices 2, 3, 4, 5, 6, and 7 connected to the network 9. And each communication terminal device 2, 3, 4, 5, 6, and 7 has the master unit operation mode which operates as the master unit, and the slave unit operation mode which operates as the slave unit. Each communication terminal device 2, 3, 4, 5, 6, and 7 includes: the storage device 21 configured to store the proper information (judging criterion information 213) used as the criterion for switching the operation mode between the master unit operation mode and the slave unit operation mode; and circuitry (the switching unit 202) configured to switch the master unit operation mode of the self device to the slave unit operation mode, when the self device is operating by the master unit operation mode, based on proper information (judging criterion information 213). Thereby, when the self device is the master unit, the communication terminal devices 2, 3, 4, 5, 6, and 7 can switch to the slave unit operation mode automatically according to judging the appropriateness as the master unit of the self device. Therefore, it reduces that an unsuitable master unit continues as the master unit.

Each communication terminal devices 2, 3, 4, 5, 6, and 7 further includes: the master unit monitoring unit 201 to judge whether master units other than the self device exist; and the communication control unit 200 to acquire the judging criterion information 213 in master units other than the self device detected by the master unit monitoring unit 201. The storage device 21 stores the judging criterion information 213 used as the criterion which judges the priority as the master unit of the self device. The switching unit 202 switches the master unit operation mode of the self device to the slave unit operation mode based on the judging criterion information 213 of the self device and the judging criterion information 213 of master units other than the self device, when the master unit monitoring unit 201 detects existence of master units other than the self device, while the self device is operating by the master unit operation mode. Thereby, even if the situation where master units other than the self device exist on the network arises while the self device is the master unit, each communication terminal devices 2, 3, 4, 5, 6, and 7 determines automatically whether the self device should switch into the slave unit according to the priority which has been decided beforehand. And if necessary, each communication terminal devices 2, 3, 4, 5, 6, and 7 can be automatically switched the operation mode of the self device to the slave unit operation mode. Therefore, the information communication system 1 cancels the situation where two or more master units coexist, while reducing the burden on construction person in charge.

Moreover, the MAC address is adopted as the judging criterion information 213 on the communication terminal devices 2, 3, 4, 5, 6, and 7. The MAC address is information uniquely assigned to each communication terminal device 2, 3, 4, 5, 6, and 7. Therefore, the master unit is easily decided to one device by judging the priority as the master unit according to the MAC address. Moreover, by diverting the existing information as the judging criterion information 213, it is not necessary to define and to generate the judging criterion information 213 newly.

Moreover, the storage device 21 stores the switching permission flag 216 which shows whether the switch to the master unit operation mode from the slave unit operation mode by the switching unit 202 is permitted. And the switching unit 202 performs the switch to the master unit operation mode from the slave unit operation mode according to the value of the switching permission flag 216. Thereby, the switching by the switching permission flag 216 can restrict the slave unit to switch to the master unit, and can reduce generating of the situation where the master unit coexists. In addition, it can select beforehand the communication terminal devices 2, 3, 4, 5, 6, and 7 which should be forbidden to switch to the master unit. Therefore, for example, the slave unit unsuitable as the master unit because of its position can be prevented from switching to the master unit.

Moreover, the storage device 21 stores the standby time 217 depending on the priority based on the judging criterion information 213. And the master unit monitoring unit 201 judges that the master unit does not exist other than the self device, when the period which cannot detect existence of the master unit other than the self device exceeds the standby time 217. Thereby, the standby time 217 is provided so that what has a high priority as the master unit may switch as the master unit earlier. Therefore, the shift frequency of the master unit in later processing is decreased.

Moreover, the storage device 21 stores the monitoring permission flag 215 which shows whether the monitoring by the master unit monitoring unit 201 is permitted. And the master unit monitoring unit 201 performs monitoring according to the monitoring permission flag 215. Thereby, compared with the case where all the communication terminal devices 2, 3, 4, 5, 6, and 7 monitor the master unit, the outbreak of the overhead due to monitoring the master unit is reduced.

Moreover, the communication terminal devices 2, 3, 4, 5, 6, and 7 includes: the master unit monitoring unit 201 which monitors whether master units other than the master unit in which the self device is registered exists, while operating by the slave unit operation mode; and the communication control unit 200 which acquires the judging criterion information 213 (the 1st judging criterion information) used as the criterion which judges the priority as the master unit of the master unit (the 1st master unit) in which the self device is registered and the judging criterion information 213 (the 2nd judging criterion information) used as the criterion which judges the priority as the master unit of the master unit (the 2nd master unit) other than the 1st master unit. When the master unit monitoring unit 201 judges the 2nd master unit exists, the communication terminal devices 2, 3, 4, 5, 6, and 7 determine either of the 1st master unit or the 2nd master unit as the master unit for the self device based on the 1st judging criterion information and the 2nd judging criterion information. Even if the situation where two or more master units exist on the network 9 arises, the master unit can be automatically determined as one device according to the priority decided beforehand.

In addition, in the above description, the master unit which has the smaller value of the judging criterion information 213 (the MAC address) is judged as what has a high priority as a master unit. However, it can be designed that the master unit which has the larger value of the judging criterion information 213 (the MAC address) is judged as what has a high priority as a master unit.

In accordance with some embodiments, the judging criterion information 213 is the MAC address which is assigned beforehand to each communication terminal device 2, 3, 4, 5, 6, and 7. However, the numerical value which determines the priority as the master unit is not limited to the MAC address.

The judging criterion information 213 in some embodiments is the number of the slave units registered in the network to which the self device belongs. And the priority which has the larger value of number of device shown in the judging criterion information 213 is judged as what has a high priority as a master unit.

The judging criterion information 213 for the master unit in some embodiments is the number of the slave units registered in the self device which is operating by the master unit operation mode. In the information communication system 1, in the master unit processing, the master unit collects the information about the slave unit registered in the self device, and builds the database about the slave unit. Therefore, the communication terminal devices 2, 3, 4, 5, 6, and 7 switched as the master unit can acquire the number of the communication terminal devices 2, 3, 4, 5, 6, and 7 which is registered in the self device as the slave unit, according to referring to this database.

On the other hand, the judging criterion information 213 for the slave unit is in some embodiments the number of the slave units registered in the master unit in which the self device is registered. In the information communication system 1, in the slave unit processing, the slave unit collects the information about the slave unit registered in the master unit in which the self device has been registered, and builds the database about the network to which the self device belongs. Therefore, the communication terminal devices 2, 3, 4, 5, 6, and 7 switched as the slave unit can acquire easily the number of the slave units registered in the master unit in which the self device is registered, according to referring to this database.

Thus, the priority about the plurality of master units can be determined by making into the judging criterion information 213 the number of the slave units registered in the network to which the self device belongs.

In addition, like the MAC address, this number is information which is acquired according to the master unit processing and the slave unit processing (PLC protocol) which are the known technology. Therefore, the information communication system 1 in some embodiments can acquire the information which is the foundation of the judging criterion information 213 by only following the conventional protocol.

Furthermore, the information communication system 1 judges high the priority of the master unit to which the large number of the slave units have been registered in the network to which the self device belongs. Therefore, the master unit to which the few number of the slave units have been registered cancels the slave unit, and switches to the slave unit. Thereby, compared with the case where the master unit to which the large number of the slave units have been registered is changed to the slave unit, the overhead which is needed for re-registration is reduced.

In addition, the situation where the number used as the judging criterion information 213 in some embodiments becomes the same in the plurality of master units may arise. In the plurality of master units, when the judging criterion information 213 becomes same value, according to using the size relation of the MAC address additionally, the information communication system 1 may determine the communication terminal devices 2, 3, 4, 5, 6, and 7 which should be maintained as the master unit. Thereby, according to using the MAC address additionally, the priority can be determined certainly to the plurality of master units.

In some embodiments, the judging criterion information 213 is the MAC address which has been assigned beforehand to each communication terminal device 2, 3, 4, 5, 6, and 7. In some embodiments, the judging criterion information 213 is the number of the slave units registered in the network to which each communication terminal device 2, 3, 4, 5, 6, and 7 belongs. These are acquired in accordance with the conventional protocol. However, a numerical value which determines the priority as the master unit of the plurality of master units and is acquired in accordance with the conventional protocol, is not limited to the MAC address or the above-mentioned number.

The judging criterion information 213 in some embodiments is the maximum of the number of times of hop (hereinafter, referred to as the "maximum hopping number") in the network to which the self device belongs. And a priority which has the smaller value of the maximum hopping number shown in the judging criterion information 213 is judged as what has a high priority as the master unit.

In some embodiments, the judging criterion information 213 for the master unit is the maximum number of hop to the slave units registered in the self device which is operating by the master unit operation mode. In the master unit processing by the information communication system 1, the master unit collects the information about the slave unit registered in the self device, and builds the database about the slave unit. Therefore, the communication terminal devices 2, 3, 4, 5, 6, and 7 switched as the master unit acquire all the number of times of hop to the slave units registered in the self device, according to referring to this database. That is, the communication terminal devices 2, 3, 4, 5, 6, and 7 as the master unit acquire the maximum hopping number, according to comparing the number of times of hop acquired.

On the other hand, the judging criterion information 213 for the slave unit in some embodiments is the maximum number of times of hop from the master unit (the master unit in the network to which the self device belongs) in which the self device has been registered to the slave units registered in that master unit. In the slave unit processing by the information communication system 1, the slave unit collects the information about the slave unit registered in the master unit in which the self device has been registered, and builds the database about the network to which the self device belongs. Therefore, the communication terminal devices 2, 3, 4, 5, 6, and 7 switched as the slave unit acquire easily each of the number of times of hop from the master unit (the master unit in the network to which the self device belongs) in which the self device has been registered to the slave units registered in that master unit, according to referring to this database. That is, the communication terminal devices 2, 3, 4, 5, 6, and 7 as the slave unit acquire easily the maximum hopping number which is set in the judging criterion information 213, according to comparing each of the number of times of hop acquired.

Thus, the priority about the plurality of master units can be determined by making into the judging criterion information 213 the maximum of the number of times of hop in the network to which the self device belongs.

In addition, like the MAC address, this number (the maximum hopping number) is information which is acquired according to the master unit processing and the slave unit processing (PLC protocol) which are the known technology. Therefore, the information communication system 1 in some embodiments can acquire the information which is the foundation of the judging criterion information 213 by only following the conventional protocol.

Moreover, the information communication system 1 makes into the judging criterion information 213 the maximum of the number of times of hop in the network to which the self device belongs, and switches the master unit which has the larger maximum hopping number into the slave unit operation mode. Thereby, the information communication system 1, in the network, can reduce the maximum of the number of times of hop.

Furthermore, the situation where the maximum hopping number used as the judging criterion information 213 in some embodiments becomes the same in the plurality of master units may arise. In the plurality of master units, when the judging criterion information 213 becomes same value, according to using the size relation of the MAC address additionally, the information communication system 1 can determine the communication terminal devices 2, 3, 4, 5, 6, and 7 which should be maintained as the master unit. Thereby, according to using the MAC address additionally, the priority can be determined certainly to the plurality of master units.

As mentioned above, although described about some embodiments, the present invention is not limited to the above-mentioned embodiments, and various deformation is possible for it.

For example, the Steps shown in some embodiments are mere examples. The Steps are not limited to the order and the contents described above. That is, if the same effect can be acquired, the order or the contents may be modified as appropriate.

The functional blocks (e.g., the master unit monitoring unit 201 and the switching unit 202) shown in some embodiments are achieved in forms of software by the operation of the CPU 20 in accordance with the program 210. However, a portion or an entire portion of those functional blocks may be formed by a dedicated logic circuit in the form of hardware.

Moreover, the numerical value used as the judging criterion information 213 is not limited to the form of the above description. For example, it may be considerable that the numerical value used as the judging criterion information 213 is the worst value of the communication quality of the slave unit registered in the network to which the self device belongs. In this case, the priority as the master unit which has the smaller numerical value of the judging criterion information 213 is judged highly. Since the master unit which has the large worst value of communication quality is switched to the slave unit operation mode by this, the worst value of the communication quality in the network 9 finally built is reduced. A retrial frequency, a noise level, and transmission speed etc., can be collected suitably as information indicating communication quality, and can be adopted. Moreover, after weighting to these suitably, the priority may be judged.

Furthermore, the judging criterion information 213 may be a time elapsed from the master unit operation mode start of the master unit in the network to which the self device belongs. In this case, the priority as the master unit which has the larger numerical value of the judging criterion information 213 is judged highly. Since the master unit where elapsed time is smaller can be switched to the slave unit operation mode by this, the master unit which has already been operating stably as the master unit is preferentially maintainable.

Moreover, the judging criterion information 213 may be a date of manufacture of the communication terminal devices 2, 3, 4, 5, 6, and 7. In that case, the priority of the new communication terminal devices 2, 3, 4, 5, 6, and 7 of the date of manufacture is judged high. The new communication terminal devices 2, 3, 4, 5, 6, and 7 have a low risk of generally breaking down compared with an old thing. Therefore, the master unit more important than the slave unit can be stabilized by making the new communication terminal devices 2, 3, 4, 5, 6, and 7 of the date of manufacture remain as the master unit preferentially.

Moreover, in some embodiments described above, when it is detected that two or more master units exist simultaneously, it has been described that one of the master units switches to the slave unit. However, the opportunity from which the master unit switches to the slave unit is not limited to this. For example, when there is fear of the performance decrement of a master unit (e.g., increasing of the number of times of a retry of the communication terminal device 2 which is operating by the master unit operation mode), the communication terminal device 2 may change the operation mode of the self device to the slave unit operation mode. That is, the communication terminal device 2 stores minimum performance as a threshold value (the proper information), and switches the operation mode according to comparing an actual value in performance with the threshold value. Moreover, a period and turn of operating as the master unit may be stored as the proper information. In this case, when the period has passed, the master unit may switch the self device to the slave unit operation mode. That is, the master unit may be made into a rotation system. Thereby, when the self device is the master unit, the competence as the master unit of the self device can be judged, and the communication terminal device 2 can switch to the slave unit operation mode automatically. Therefore, the situation in which an unsuitable master unit continues as the master unit is reduced.

While the invention has been shown and described in detail, the foregoing description is in all aspects illustrative and not restrictive. It is therefore understood that numerous modifications and variations can be devised without departing from the scope of the invention. The scope of the present invention is shown by claims.

What is claimed is:

1. A communication terminal device connected to a network and performing data communications with another communication terminal device through the network, comprising:
   a storage configured to store proper information used as a criterion for switching an operation mode between a master unit operation mode and a slave unit operation mode; and
   circuitry configured to
      switch the master unit operation mode of a self device to the slave unit operation mode based on the proper information, while the self device is operating by the master unit operation mode, wherein
   the master unit operation mode is the operation mode of the communication terminal device operating as a master unit, and
   the slave unit operation mode is the operation mode of the communication terminal device operating as a slave unit, wherein
   the proper information includes judging criterion information used as the criterion which judges the priority as the master unit of the self device, and
   the circuitry is further configured to:
      monitor whether or not the other communication terminal device is the another master unit, when the self device operates by the master unit operation mode,
      acquire the judging criterion information of the other communication terminal device detected as the other master unit, and
      switch, while the self device is operating by the master unit operation mode and when the other master unit is detected by monitoring, the master unit operation mode of the self device to the slave unit operation mode based on the judging criterion information of the self device and the judging criterion information of the other master unit.

2. The communication terminal device according to claim 1, wherein
   the judging criterion information of the self device is MAC address of the self device; and
   the judging criterion information of the other master unit is MAC address of the other master unit.

3. The communication terminal device according to claim 1, wherein
   the judging criterion information of the self device is the number of the slave units registered in the self device operating by the master unit operation mode, and the judging criterion information of the other master unit is the number of the slave units registered in the other master unit.

4. The communication terminal device according to claim 1, wherein
the judging criterion information of the self device is the maximum number of hop to the slave units registered in the self device operating by the master unit operation mode, and
the judging criterion information of the other master unit is the number of hop to slave units registered in the other master unit.

5. The communication terminal device according to claim 1, wherein
the judging criterion information of the self device is the worst value of communication quality between the slave units registered in the self device operating by the master unit operation mode, and
the judging criterion information of the other master unit is the worst value of communication quality between the slave units registered in the other master unit.

6. The communication terminal device according to claim 1, wherein
the judging criterion information of the self device is a time elapsed from the master unit operation mode start of the self device, and
the judging criterion information of the other master unit is a time elapsed from the master unit operation mode start of the other master unit.

7. The communication terminal device according to claim 1, wherein
the circuitry is further configured to switch, while the self device is operating by the operation mode other than the master unit operation mode and when the circuitry judges that no master unit exists in the other communication terminal device, the operation mode of the self device to the master unit operation mode.

8. The communication terminal device according to claim 7, wherein
the circuitry is further configured to:
switch, while the self device is operating by the slave unit operation mode and when the circuitry judges that no master unit exists in the other communication terminal device, the slave unit operation mode of the self device to the master unit operation mode.

9. The communication terminal device according to claim 7, wherein
the storage stores switching permission flag which indicates whether or not switching to the master unit operation mode from the slave unit operation mode is permitted to the circuitry, and
the circuitry is further configured to perform the switching to the master unit operation mode from the slave unit operation mode according to the switching permission flag.

10. The communication terminal device according to claim 7, wherein
the storage stores standby time which depends on priority based on the judging criterion information, and
the circuitry is further configured to judge, when the circuitry judges that the standby time has passed without discovering the master unit in the other communication terminal device, no master unit exists in the other communication terminal device.

11. The communication terminal device according to claim 1, wherein the storage stores monitoring permission flag which indicates whether or not the monitoring by the circuitry is permitted, and
the circuitry is further configured to perform the monitoring according to the monitoring permission flag.

12. The communication terminal device according to claim 1, wherein the circuitry is further configured to
register the self device to a blacklist, wherein any device on the blacklist is not available to operate by the master unit operation mode again until predetermined conditions are met.

13. The communication terminal device according to claim 12, wherein the circuitry is further configured to
delete the master unit registered in the blacklist when the self device is registered in a new master unit.

14. The communication terminal device according to claim 12, wherein the circuitry is further configured to
delete the master unit from the blacklist when a predetermined amount of time has passed after registering the self device in the blacklist.

15. The communication terminal device according to claim 12, wherein the circuitry is further configured to
clear the blacklist when no other communication terminal devices are operating by the master unit operation mode.

16. A communication terminal device connected to a network and performing data communications with another communication terminal device through the network, comprising:
circuitry configured to:
monitor whether or not a new master unit other than a current master unit registering a self device exists in the other communication terminal device, while the self device is operating by a slave unit operation mode;
acquire first judging criterion information used as a criterion for judging a priority as the master unit of the current master unit and second judging criterion information used as a criterion for judging a priority as the master unit of the new master unit;
select when the circuitry judges that the new master unit exists, one of the current master unit or the new master unit as the master unit of the self device based on comparing the first judging criterion information and the second judging criterion information; wherein
the slave unit operation mode is the operation mode of the communication terminal device operating as a slave unit.

17. An information communication system comprising a plurality of communication terminal devices connected to a network,
the communication terminal device comprising:
a storage configured to store proper information used as a criterion for switching an operation mode between a master unit operation mode and a slave unit operation mode; and
circuitry configured to
switch the master unit operation mode of a self device to the slave unit operation mode based on the proper information, while the self device is operating by the master unit operation mode, wherein
the master unit operation mode is the operation mode of the communication terminal device operating as a master unit, and the slave unit operation mode is the operation mode of the communication terminal device operating as a slave unit, wherein the proper information includes judging criterion information used as the criterion which judges the priority as the master unit of the self device, and the circuitry is further configured to:

monitor whether or not the other communication terminal device is another master unit, when the self device operates by the master unit operation mode, acquire the judging criterion information of the other communication terminal device detected as the other master unit, and switch, while the self device is operating by the master unit operation mode and when the other master unit is detected by monitoring, the master unit operation mode of the self device to the slave unit operation mode based on the judging criterion information of the self device and the judging criterion information of the other master unit.

18. A non-transitory computer-readable storage medium storing computer-readable instructions that, when executed by a computer including storage and circuitry, cause the computer to perform a method comprising:

storing proper information used as a criterion for switching an operation mode between a master unit operation mode and a slave unit operation mode;

switching the master unit operation mode of a self device to the slave unit operation mode based on the proper information, while the self device is operating by the master unit operation mode, wherein the master unit operation mode is the operation mode of the computer operating as a master unit, the slave unit operation mode is the operation mode of the computer operating as a slave unit, the computer is connected to a network and performs data communications between another communication terminal device through the network, and the proper information includes judging criterion information used as the criterion which judges the priority as the master unit of the self device, the method further comprising:

monitoring whether or not the other communication terminal device is another master unit, when the self device operates by the master unit operation mode;

acquiring the judging criterion information of the other communication terminal device detected as the other master unit; and switching, while the self device is operating by the master unit operation mode and when the other master unit is detected by monitoring, the master unit operation mode of the self device to the slave unit operation mode based on the judging criterion information of the self device and the judging criterion information of the other master unit.

19. A non-transitory computer-readable storage medium storing computer-readable instructions that, when executed by a computer including circuitry, cause the computer to perform a method comprising:

monitoring whether or not a new master unit other than a current master unit registering a self device exists in another communication terminal device, while the self device is operating by a slave unit operation mode;

acquiring first judging criterion information used as a criterion for judging a priority as the master unit of the previous master unit and second judging criterion information used as a criterion for judging a priority as the master unit of the new master unit;

selecting when the circuitry judges that the new master unit exists, one of the current master unit and the new master unit as the master unit of the self device based on the first judging criterion information and the second judging criterion information; wherein the slave unit operation mode is the operation mode of the computer operating as a slave unit, and the computer is connected to a network and performs data communications with the other communication terminal device through the network.

20. An information communication method for performing data communications between a plurality of communication terminal devices including circuitry, and having a master unit operation mode operating as a master unit and a slave unit operation mode operating as a slave unit, comprising:

storing, by the circuitry, proper information used as a criterion for switching an operation mode between the master unit operation mode and the slave unit operation mode in each of the plurality of communication terminal devices; and switching, by the circuitry, when the communication terminal device is operating by the master unit operation mode, the master unit operation mode of a self device to the slave unit operation mode based on the proper information, wherein the proper information includes judging criterion information used as the criterion which judges the priority as the master unit of the self device, the method further comprising:

monitoring, by the circuitry, whether or not another communication terminal device is another master unit, when the self device operates by the master unit operation mode;

acquiring, by the circuitry, the judging criterion information of the other communication terminal device detected as the other master unit; and switching, by the circuitry, while the self device is operating by the master unit operation mode and when the other master unit is detected by monitoring, the master unit operation mode of the self device to the slave unit operation mode based on the judging criterion information of the self device and the judging criterion information of the other master unit.

* * * * *